US012499846B2

(12) United States Patent
Llull et al.

(10) Patent No.: US 12,499,846 B2
(45) Date of Patent: Dec. 16, 2025

(54) DYNAMIC COLOR UNIFORMITY CORRECTION DISPLAY SYSTEM

(71) Applicant: Snap Inc., Santa Monica, CA (US)

(72) Inventors: Patrick Llull, Los Altos, CA (US); Shaheen Moubedi, Los Angeles, CA (US); Miller Harry Schuck, III, Erie, CO (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/676,225

(22) Filed: May 28, 2024

(65) Prior Publication Data

US 2025/0372050 A1 Dec. 4, 2025

(51) Int. Cl.
*G09G 3/34* (2006.01)
*G09G 3/00* (2006.01)

(52) U.S. Cl.
CPC ........... *G09G 3/3413* (2013.01); *G09G 3/003* (2013.01); *G09G 2320/0242* (2013.01); *G09G 2320/0626* (2013.01); *G09G 2320/0693* (2013.01)

(58) Field of Classification Search
CPC ................. G09G 3/3413; G09G 3/003; G09G 2320/0242; G09G 2320/0626; G09G 2320/0693
See application file for complete search history.

(56) References Cited

U.S. PATENT DOCUMENTS

| | | | | |
|---|---|---|---|---|
| 6,411,047 | B1 * | 6/2002 | Okazaki | G09G 3/32 345/55 |
| 7,262,753 | B2 | 8/2007 | Tanghe et al. | |
| 7,884,832 | B2 * | 2/2011 | Alessi | G09G 3/3208 345/589 |
| 7,969,430 | B2 | 6/2011 | Korcharz et al. | |
| 9,336,746 | B2 * | 5/2016 | Oda | G09G 3/36 |
| 9,865,226 | B2 | 1/2018 | Buckett et al. | |
| 10,062,334 | B2 | 8/2018 | You et al. | |
| 10,847,075 | B1 * | 11/2020 | Buckley | G09G 3/2044 |
| 10,957,235 | B1 * | 3/2021 | Buckley | G09G 3/2044 |
| 11,043,164 | B2 * | 6/2021 | Leerentveld | A61G 13/108 |
| 11,250,810 | B2 | 2/2022 | Buckley et al. | |
| 11,263,729 | B2 * | 3/2022 | Margolis | H04N 13/324 |
| 11,302,234 | B2 * | 4/2022 | Buckley | G09G 3/2077 |
| 11,347,056 | B2 | 5/2022 | Robbins et al. | |
| 11,410,580 | B2 | 8/2022 | Buckley et al. | |

(Continued)

OTHER PUBLICATIONS

"International Application Serial No. PCT US2025 030535, International Search Report mailed Jul. 25, 2025", 3 pgs.

(Continued)

*Primary Examiner* — Vinh T Lam
(74) *Attorney, Agent, or Firm* — SCHWEGMAN LUNDBERG & WOESSNER, P.A

(57) ABSTRACT

A display system for color correcting a display. An emitter of the display is configured to receive an electrical stimulus having a magnitude, and emit an amount of light that increases with increased magnitude of the electrical stimulus. A display controller is configured to apply an amount of color non-uniformity correction to the display to adjust respective amounts of light of two or more wavelengths emitted by the display, the amount of color non-uniformity correction applied decreasing with increased magnitude of the electrical stimulus.

20 Claims, 17 Drawing Sheets

(56) References Cited

U.S. PATENT DOCUMENTS

| | | | | |
|---|---|---|---|---|
| 11,626,057 | B1 * | 4/2023 | Park | G09G 3/2003 345/690 |
| 11,681,363 | B2 | 6/2023 | Buckley | |
| 11,705,029 | B1 * | 7/2023 | Zhang | G09G 3/3225 345/694 |
| 11,754,846 | B2 | 9/2023 | Buckley et al. | |
| 11,929,040 | B2 * | 3/2024 | Johannessen | G09G 3/2003 |
| 12,112,695 | B2 * | 10/2024 | Thielemans | H10K 59/1216 |
| 12,142,207 | B2 * | 11/2024 | Gao | G09G 3/3225 |
| 12,190,773 | B2 * | 1/2025 | Hai | G09G 3/2007 |
| 12,205,526 | B2 * | 1/2025 | Lee | G09G 3/2003 |
| 12,243,463 | B2 * | 3/2025 | Lee | G09G 3/2003 |
| 2013/0257835 | A1 | 10/2013 | Bell | |
| 2014/0333648 | A1 | 11/2014 | Ouchi | |
| 2016/0187654 | A1 | 6/2016 | Border et al. | |
| 2018/0129050 | A1 | 5/2018 | Hayashi et al. | |
| 2020/0267359 | A1 | 8/2020 | Seiler et al. | |
| 2021/0125577 | A1 | 4/2021 | Hong et al. | |
| 2021/0407365 | A1 | 12/2021 | Messer et al. | |
| 2022/0099975 | A1 | 3/2022 | Schultz et al. | |
| 2022/0133140 | A1 | 5/2022 | Kojima | |
| 2022/0308661 | A1 | 9/2022 | Buckley | |
| 2022/0366820 | A1 | 11/2022 | Goswami et al. | |
| 2023/0245610 | A1 | 8/2023 | Kim et al. | |
| 2023/0290290 | A1 | 9/2023 | Shams et al. | |
| 2023/0298541 | A1 | 9/2023 | Rangaprasad et al. | |

OTHER PUBLICATIONS

"International Application Serial No. PCT US2025 030535, Written Opinion mailed Jul. 25, 2025", 10 pgs.

"International Application Serial No. PCT US2025 029534, Invitation to Pay Additional Fees mailed Jul. 29, 2025", 11 pgs.

"U.S. Appl. No. 18/676,140, Non Final Office Action mailed Jun. 20, 2025", 15 pgs.

* cited by examiner

DYNAMIC COLOR UNIFORMITY CORRECTION DISPLAY SYSTEM

TECHNICAL FIELD

The present disclosure relates generally to display devices and more particularly to display devices and systems used for extended reality.

BACKGROUND

Light-emitting diode (LED) technology is used in modern display systems due to its efficiency, longevity, and the quality of light it can produce. LEDs are semiconductor devices that emit light when an electrical current passes through them. The color of the light emitted by an LED is determined by the materials used in its construction as well as the voltage applied across the terminals of the LED, which define the wavelength of the emitted photons.

In display systems, LEDs are often used as a backlight source for liquid crystal displays (LCDs), or as a frontside illuminator source for Liquid Crystal on Silicon (LCOS or LCOS) displays, or as individual pixel elements in direct-view emissive LED displays. The brightness of an LED is directly related to the amount of current driven through it; as the current increases, the emitted light's intensity typically increases as well. This relationship allows for precise control over the brightness levels in a display by modulating the current supplied to the LEDs.

However, achieving uniform color across a display is a significant challenge, particularly in systems that use waveguide technology. Waveguides are optical components that guide light from the LED backlight or other light source to the viewer's eye. They are used in various display systems, including augmented reality (AR) and virtual reality (VR) (jointly, extended reality (XR)) headsets, where compactness and the ability to direct light efficiently are crucial.

One challenge arising in the context of waveguides is color uniformity. Due to variations in the efficiency (e.g., optical out-coupling efficiency) of a waveguide across its surface with respect to different wavelengths of light, certain areas of the image presented by the waveguide may appear tinted with different hues, such as more blue, green, or red, compared to others. This non-uniformity can be caused by several factors, including nonuniformities in the waveguide material, variations in the light source, or the waveguide's geometric design.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Examples described herein relate to a display system that attempts to address the challenge of maintaining color consistency across a virtual image surface presented by a display while extending brightness range. The system dynamically adjusts color uniformity correction in response to changes in display brightness, potentially improving visual uniformity, particularly in low-light conditions, without unduly affecting the efficiency and battery life of the display system.

Some examples incorporate a control mechanism that gradually applies color uniformity correction as the display's backlight brightness is reduced. This approach may result in enhanced display uniformity across the full area of the eyebox (the area of the waveguide display through which a user's eye can perceive the projected image/data) at lower brightness levels and an extended range of brightness due to the modulation of LED current. The control mechanism is designed to minimize the impact on battery life by applying minimal correction at high brightness levels, where uniformity issues are less noticeable, and increasing correction at low brightness levels, where maintaining uniformity is more critical for the user experience.

Some examples allow for the individual adjustment of the color uniformity correction scaling factor for each color channel, which may optimize the balance between color correction and brightness extension. Further, some examples may include fine-tuning the illumination time for each color channel of a color sequential display system, allowing for additional customization and optimization of the display's performance across various brightness levels. These features may enable the display system to adapt to different user environments and preferences, potentially offering an improved visual experience under a broad range of operating conditions. Other technical solutions and features will be appreciated based on the figures, description, and claims herein.

Figure 1:
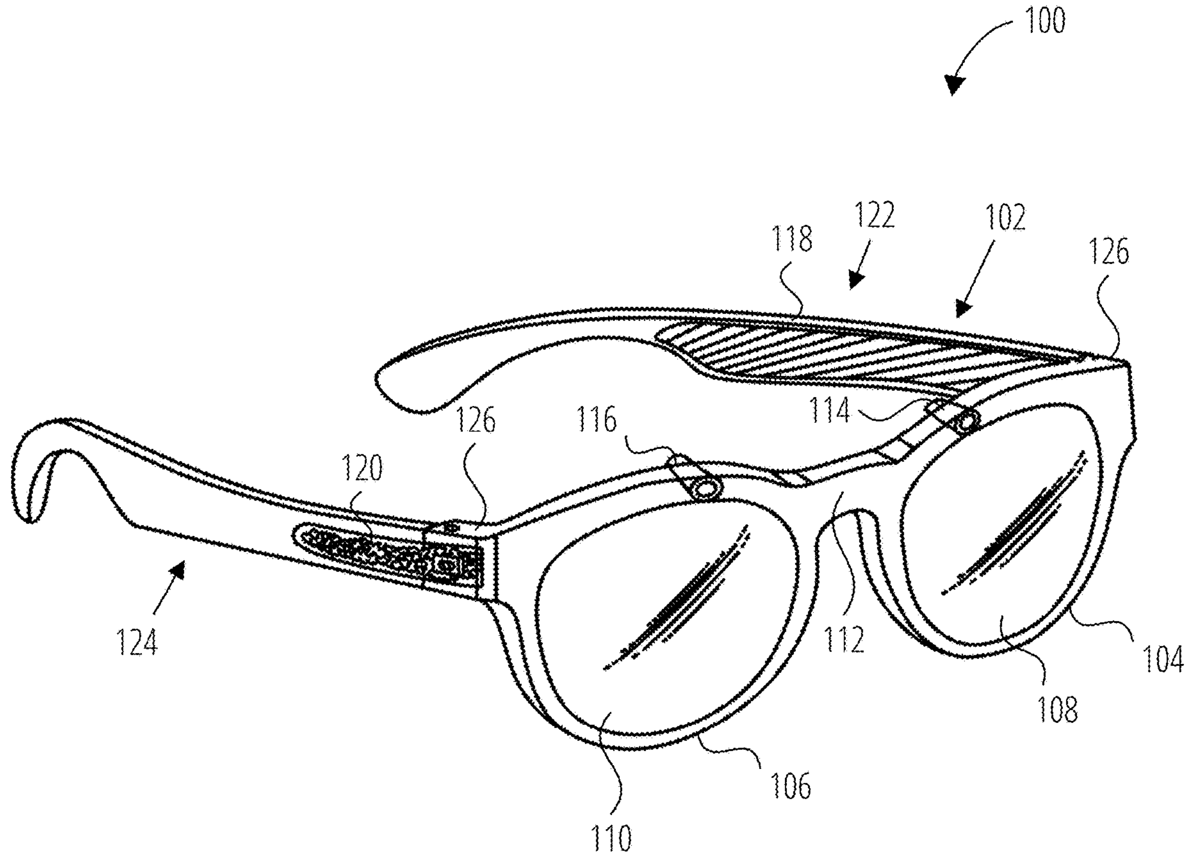
FIG. 1 is a perspective view of a head-worn device, in accordance with some examples.

FIG. 1 is a perspective view of a head-worn XR device (e.g., a display system 100 shown as XR glasses), in accordance with some examples. The display system 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 (e.g., a display or lens holder) connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the display system 100. The right optical element 110 and the left optical element 108 can each be considered to provide a display configured to present an image at a virtual image surface having a plurality of virtual image surface locations, as described below with reference to FIG. 2.

The frame 102 additionally includes a left arm or temple piece 122 and a right arm or temple piece 124. In some examples the frame 102 can be formed from a single piece of material so as to have a unitary or integral construction.

The display system 100 can include a computing device, such as a computer 120 having a processor and a memory storing instructions for execution by the processor. The computer 120 can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. Various other examples may include these elements in different configurations or integrated together in different ways. In some examples, the computer 120 can be implemented by a machine 1600 or machine 1704 as described below with reference to FIG. 16 or FIG. 17.

The computer 120 additionally includes a battery 118 or other suitable portable power supply. In some examples, the battery 118 is disposed in left temple piece 122 and is electrically coupled to the computer 120 disposed in the right temple piece 124. The display system 100 can include a connector or port (not shown) suitable for charging the battery 118, a wireless receiver, transmitter or transceiver (not shown), or a combination of such devices.

The display system 100 can include a first or left camera 114 and a second or right camera 116. Although two cameras are depicted, other examples contemplate the use of a single or additional (i.e., more than two) cameras. In one or more examples, the display system 100 can include any number of input sensors or other input/output devices in addition to the left camera 114 and the right camera 116, such as location sensors, motion sensors, and so forth. It will be appreciated that the cameras 114, 116 are a form of optical sensor, and that the display system 100 may include additional types of optical sensors in some examples.

Figure 2:
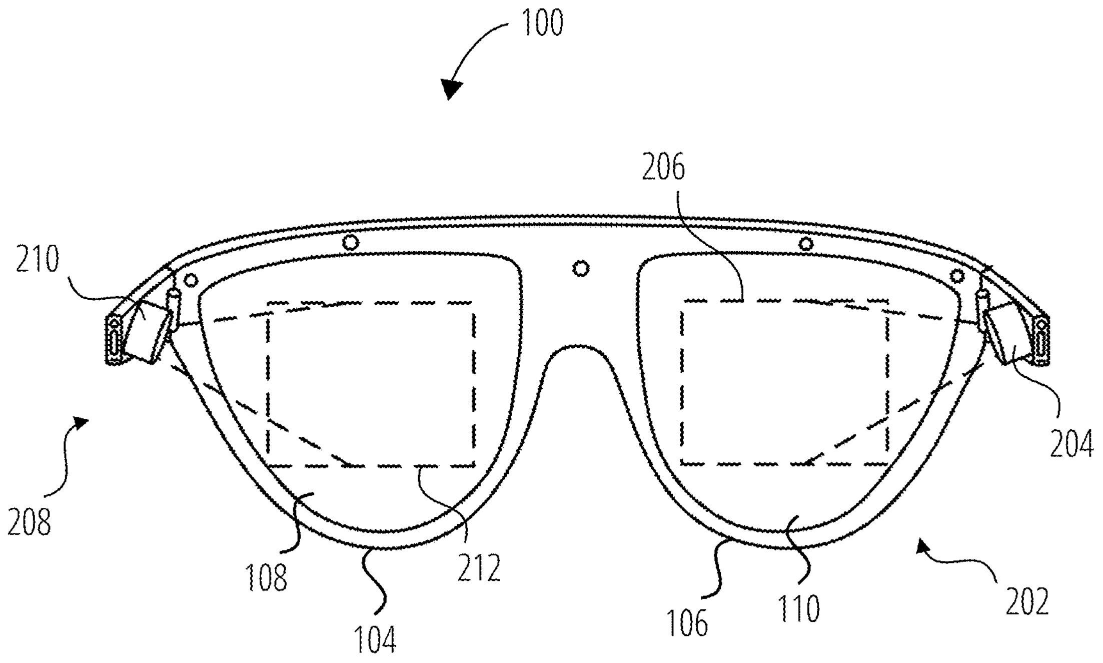
FIG. 2 illustrates a further view of the head-worn device of FIG. 1, in accordance with some examples.

FIG. 2 illustrates the display system 100 from the perspective of a user. For clarity, a number of the elements shown in FIG. 1 have been omitted. As described in FIG. 1, the display system 100 shown in FIG. 2 includes left optical element 108 and right optical element 110 secured within the left optical element holder 104 and the right optical element holder 106, respectively.

The display system 100 include right forward optical assembly 202 comprising a right projector 204 and a right display device 206, and a left forward optical assembly 208 including a left projector 210 and a left display device 212. The right forward optical assembly 202 (with or without right optical element 110) may be referred to herein as a right near-eye display, the left forward optical assembly 208 (with or without left optical element 108) may be referred to herein as a left near-eye display, and each may be referred to herein as a near-eye display or a near-eye optical see-through XR display.

In some examples, the display devices 206 are waveguides. The waveguides include reflective or diffractive structures (e.g., gratings, holograms and/or optical elements such as mirrors, lenses, or prisms). Projected light emitted by the projector 204 encounters the diffractive structures of the waveguide of the display device 206, which directs the light towards the right eye of a user to provide an image (e.g., a right-eye image) on or in the right optical element 110 that overlays the view of the real world seen by the user. Similarly, projected light emitted by the projector 210 encounters the diffractive structures of the waveguide of the display device 212, which directs the light towards the left eye of a user to provide an image (e.g., a left-eye image) on or in the left optical element 108 that overlays the view of the real world seen by the user. The combination of a GPU, the right forward optical assembly 202, the left optical element 108, and the right optical element 110 provide an optical engine of the display system 100. The display system 100 uses the optical engine to generate an overlay of the real world view of the user including display of a 3D user interface to the user of the display system 100. The surface of the optical element 108 or 110 from which the projected light exits toward the user's eye is referred to as a user-facing surface, an image presentation surface, or a display surface of the near-eye optical see-through XR display. The light exits the image presentation surface of the waveguide at one or more exit pupil locations; at each exit pupil location, the different portions of the image exit at different angles. As a result of the angles at which the light exits the exit pupils toward the user's eye, the image is perceived by a user as extending across a surface in space, referred to herein as a virtual image surface. The virtual image surface is a surface in physical space where the user's eyes converge and focus to view the image; thus, the position and shape of the virtual image surface is a function of the physical properties of the light propagating from the waveguide surface toward the user's eyes.

Figure 3:
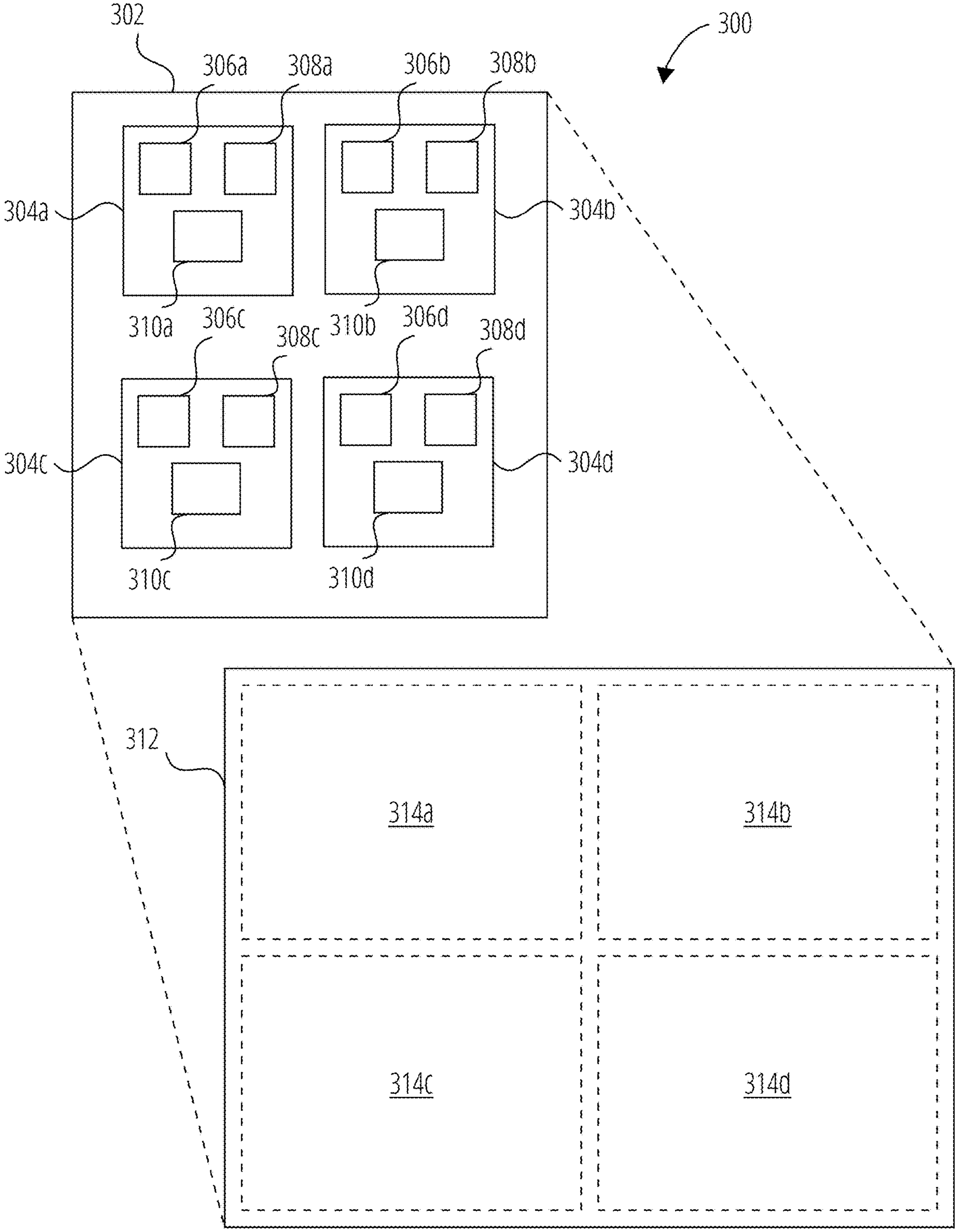
FIG. 3 illustrates a block diagram of a first example display showing pixels of a pixel array mapped to a virtual image surface, in accordance with some examples.
Figure 4:
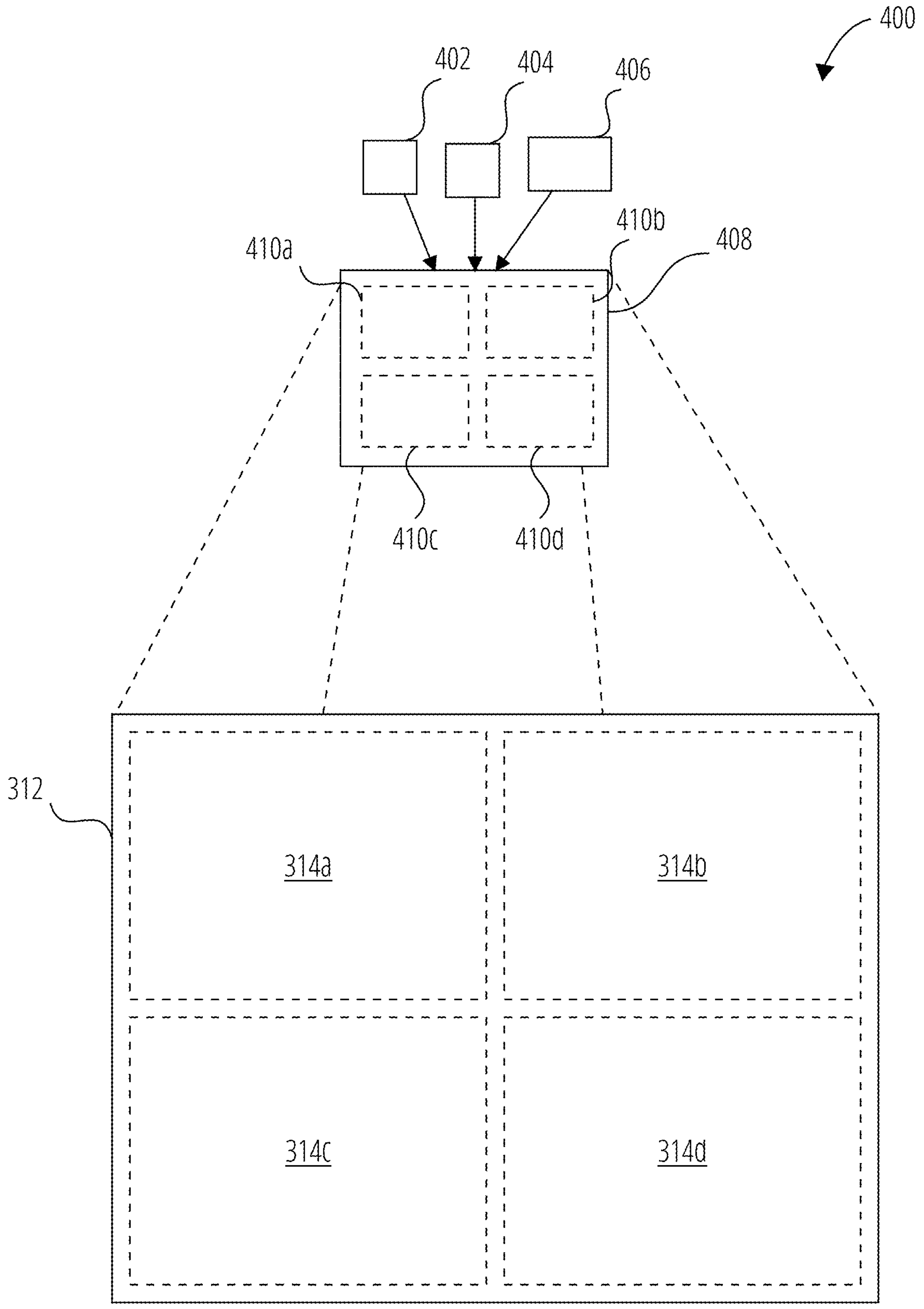
FIG. 4 illustrates a block diagram of a second example display showing color-specific emitters and pixels of an image former mapped to a virtual image surface, in accordance with some examples.
Figure 5:
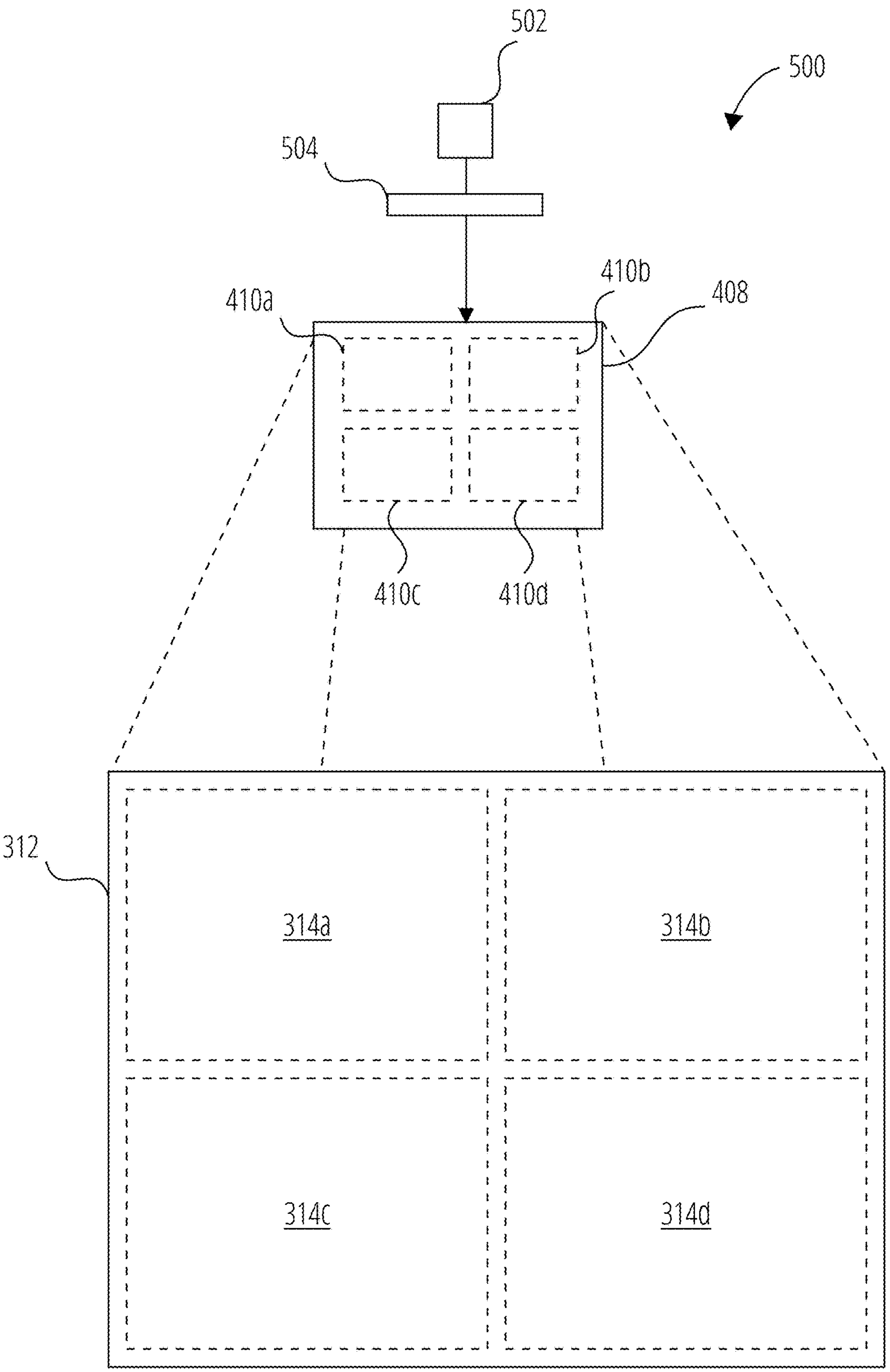
FIG. 5 illustrates a block diagram of a third example display showing a white light emitter, a color wheel, and pixels of an image former mapped to a virtual image surface, in accordance with some examples.

It will be appreciated that other display technologies or configurations may be utilized within an optical engine to display an image to a user in the user's field of view. For example, instead of a projector 204 and a waveguide, a liquid crystal display (LCD), light emitting diode (LED) array, or other display type may be provided. In some examples, one or more liquid crystal on silicon (LCOS) panels may be used to modulate reflection of light of one or more colors to define individual pixels of the images presented by each display and thereby propagate the colors of light forming the images to various locations across one or more virtual image surfaces. In some examples, one or more LED arrays may be used to emit light of one or more colors from each of an array of LED pixels, thereby propagating the light of one or more colors to various display surface locations. In display types using a conventional 2D screen to present light toward the user's eyes, the virtual image surface can be considered to be identical to the 2D surface of the screen. FIG. 3 through FIG. 5 illustrate various display types suitable for use with the color correction systems and methods described herein.

In use, a user of the display system 100 will be presented with information, content and various 3D user interfaces on the near eye displays. As described in more detail herein, the user can then interact with the display system 100 using the buttons 126, voice inputs or touch inputs on an associated device, and/or hand movements, locations, and positions detected by the display system 100.

FIG. 3 shows a simplified block diagram of a first example display 300 having a pixel array 302 and a virtual surface 312. The pixel array 302 includes a simplified array of pixels 304*a*, 304*b*, 304*c*, and 304*d*-whereas only four pixels are shown in the drawing for clarity, it will be appreciated that some examples can include much larger pixel arrays having thousands or millions of pixels. Each pixel has three elements configured to propagate light of each of three wavelengths: a first color emitter 306*a*, 306*b*, 306*c*, or 306*d* configured to propagate first light of a first wavelength (e.g., blue light having a dominant or center wavelength of 450 to 495 nanometers (nm)), a second color emitter 308*a*, 308*b*, 308*c*, or 308*d* configured to propagate second light of a second wavelength (e.g., green light having a dominant or center wavelength of 500 to 570 nm), and a third color emitter 310*a*, 310*b*, 310*c*, or 310*d* configured to propagate third light of a third wavelength (e.g., red light having a dominant or center wavelength of 620 to 750 nm). In some examples, the pixel array 302 is an array of microLEDs having a micron-scale pixel pitch, e.g., a pitch of less than 20 microns, less than 10 microns, or less than 5 microns. In some examples, the microLED array includes between 105 and 107 pixels, and provides a light source and image former for a projector (e.g., projector 204 or projector 210).

In various examples, the pixels of the image former may be defined by one or more of the image forming technologies described above. In some examples, a given pixel can be implemented by a red-green-blue (RGB) LED pixel having a blue light emitter (e.g., first color emitter 306*a*), a green light emitter (e.g., second color emitter 308*a*), and a red light emitter (e.g., third color emitter 310*a*). It will be appreciated that any suitable means of forming a multicolored image can be used to implement the pixel array 302 in various examples. Each colored light emitter (e.g., first color emitter 306*a*) of a pixel is configured to emit varying amounts of light of each of the three colors. The amount of light that a given colored light emitter emits can be modulated by the application of an electrical stimulus to the colored light emitter. For example, a backplane circuit of an LED array may apply a first electrical stimulus (e.g., a first current or voltage) to the first color emitter 306*a* to drive the first color emitter 306*a* to emit a first amount of the first light having a first wavelength, apply a second electrical stimulus (e.g., a second current or voltage) to the second color emitter 308*a* to drive the second color emitter 308*a* to emit a second amount of the second light having a second wavelength, and apply a third electrical stimulus (e.g., a third current or voltage) to the third color emitter 310*a* to drive the third color emitter 310*a* to emit a third amount of the third light having a third wavelength. By varying the relative values (e.g., current or voltage values) of the first electrical stimulus, second electrical stimulus, and third electrical stimulus, the color mix of the light propagated by the pixel 304*a* can be modulated.

In other examples, where a reflective display, such as a LCOS display, is used, the display may be illuminated using a individual macro red, green and blue LEDs or using panels of red, green and blue microLED elements. Such light sources are controlled to sequentially illuminate the LCOS with red, green and blue light, relying on the persistence of light to achieve a full color image perceived by a user of the device. Such light sources may be controlled as described above to modulate the intensity of light being used to illuminate the LCOS panel. Examples of such displays are described below with reference to FIG. 4 and FIG. 5.

The pixel array 302 thus emits light to form the image. The light forming the image is propagated (e.g., via a projector and waveguide, or via presentation through or on an LCD or LED display panel) to a virtual image virtual surface 312, via a display surface such as an eye facing surface of the waveguide. The pixels forming the image correspond to virtual image surface locations: in the illustrated example, pixel 304*a* corresponds to virtual image surface location 314*a*, pixel 304*b* corresponds to virtual image surface location 314*b*, pixel 304*c* corresponds to virtual image surface location 314*c*, and pixel 304*d* corresponds to virtual image surface location 314*d*. Thus, the color mix of the light emitted by a given pixel ideally results in light having the same color mix presented to a user from the corresponding virtual image surface location.

However, in some cases the various colors of light emitted from each pixel do not propagate to illuminate the corresponding virtual image surface locations ideally or homogeneously. Light can be lost or distorted, and this loss or distortion can be non-uniform with respect to different virtual image surface locations and to different colors of light. Such losses and distortions can result in non-uniformity of the color of light presented at different virtual image surface locations, such that the white point of the image is different at different virtual image surface locations. Such color non-uniformity can have various negative effects, such as reduced realism and/or accuracy of images presented by the display, user distraction, degraded presentation of flat colors, skin tones, and/or images of clothing or decorations, mismatching of colors of virtual content with real-world visual content in XR, and in some cases (e.g., binocular near-eye displays), chromatic binocular rivalry, which can result in visual discomfort.

Losses or distortions in the propagation of light to illuminate the virtual image surface can arise due to various factors specific to the display technology being used. In the context of waveguides having diffractive optical structures for coupling light out of the display surface of the waveguide, different colors of light may interact with the diffractive optical structures according to different patterns according to the wavelengths of the light: for example, blue light having a relatively short wavelength may have a relatively steep angle of total internal reflection within the waveguide, resulting in a greater number of interactions with the diffractive optical structures relative to light having longer wavelengths (e.g., green or red light) over the same area of the waveguide surface. This can result in larger amounts of blue light exiting the waveguide in the proximity of an input region near the light source, compared to the amounts of green and red light exiting the waveguide in the proximity of an input region. By the same token, because of this relatively large amount of blue light leakage near the light input, the amount of blue light exiting the waveguide in regions distal from the light source may be correspondingly diminished relative to green and red light, as the blue light is exhausted relatively closer to the input. Other loss or distortion effects affecting the propagation of light through and/or out of the waveguide at various display surface locations can cause other non-uniformities of one or more of the colors of light based on the optical and structural details of the diffractive optical elements used, the materials used for the waveguide, and other design factors.

One source of loss or distortion giving rise to color non-uniformity in waveguide-based displays is described below with reference to FIG. 6 and FIG. 7. Examples of non-uniform color effects are described with reference to FIG. 8 through FIG. 11. Examples of techniques for correcting these color non-uniformities are described with reference to FIG. 12 through FIG. 15. Finally, examples of machines, systems, and software architectures for implementing the techniques described herein are described with reference to FIG. 16 and FIG. 17.

FIG. 4 illustrates a block diagram of a second example display 400 showing three color-specific emitters (first color emitter 402, second color emitter 404, and third color emitter 406), emitting light formed by pixels 410*a*-410*d* of an image former 408 to form an image, which is mapped to a virtual image virtual surface 312. Similar to the pixels 304*a* to 304*d* of the display 300, the pixels 410*a* to 410*d* of the display 400 are mapped, respectively, to virtual image surface locations 314*a* to virtual image surface location 314*d*.

Unlike the first example display 300 shown in FIG. 3, this display 400 separates the emitters from the image former 408. Each color-specific emitter 402 to 406 can be a colored light emitter, such as a colored LED or an array of same-colored LEDs. The image former 408 can be an array of liquid crystal elements configured to selectively modulate reflectance and/or transmission of light in order to form an image from the light emitted by one or more of the color-specific emitters 402 to 406. In some examples, the display 400 is an RGB LCOS display configured to emit red, green, and blue light from the three color-specific emitters (e.g., first color emitter 402 may be a blue LED, second color emitter 404 may be a green LED, and third color emitter 406 may be a red LED) and selectively reflect the light from liquid crystal pixels 410*a*-410*d* of an LCOS panel implementing image former 408 to form an image. The image can be projected or otherwise propagated the virtual image surface to illuminate the virtual image surface 312, e.g., by a waveguide having input and output diffractive elements.

The display 400 can operate as a color sequential display employing field sequential color techniques to project or otherwise propagate an RGB color image. For example, the first color emitter 402, second color emitter 404, and third color emitter 406 may be stimulated in sequence, such that the first color emitter 402 emits light during a first color sub-frame time period, the second color emitter 404 emits light during a second color sub-frame time period, and the third color emitter 406 emits light during a third color sub-frame time period. In some examples, the magnitude of the electrical stimulus applied to each emitter 402 to 406 during its respective color sub-frame time period, and/or the duration of each color sub-frame time period, can be independently controlled to modulate the amount of each color of light emitted during a frame (a frame encompassing at least one color sub-frame time period for each emitted color of light).

FIG. 5 illustrates a block diagram of a third example display 500 showing a white light backlight emitter 502, a color wheel 504, an image former 408, and a virtual image virtual surface 312. In this example, the image former 408 and virtual image surface 312 operate as in the display 400 of FIG. 4. However, the sequential propagation of the different colors of light is enabled by a color wheel 504 or other multi-color filter, which interposes different colored filters between the backlight emitter 502 and the image former 408 during the different color sub-frame time periods. As described with reference to the display 400 above, the magnitude of the electrical stimulus applied to the backlight emitter 502 during each color sub-frame time period, and/or the duration of each color sub-frame time period, can be independently controlled to modulate the amount of each color of light propagated to the image former 408 during a frame.

Figure 6:
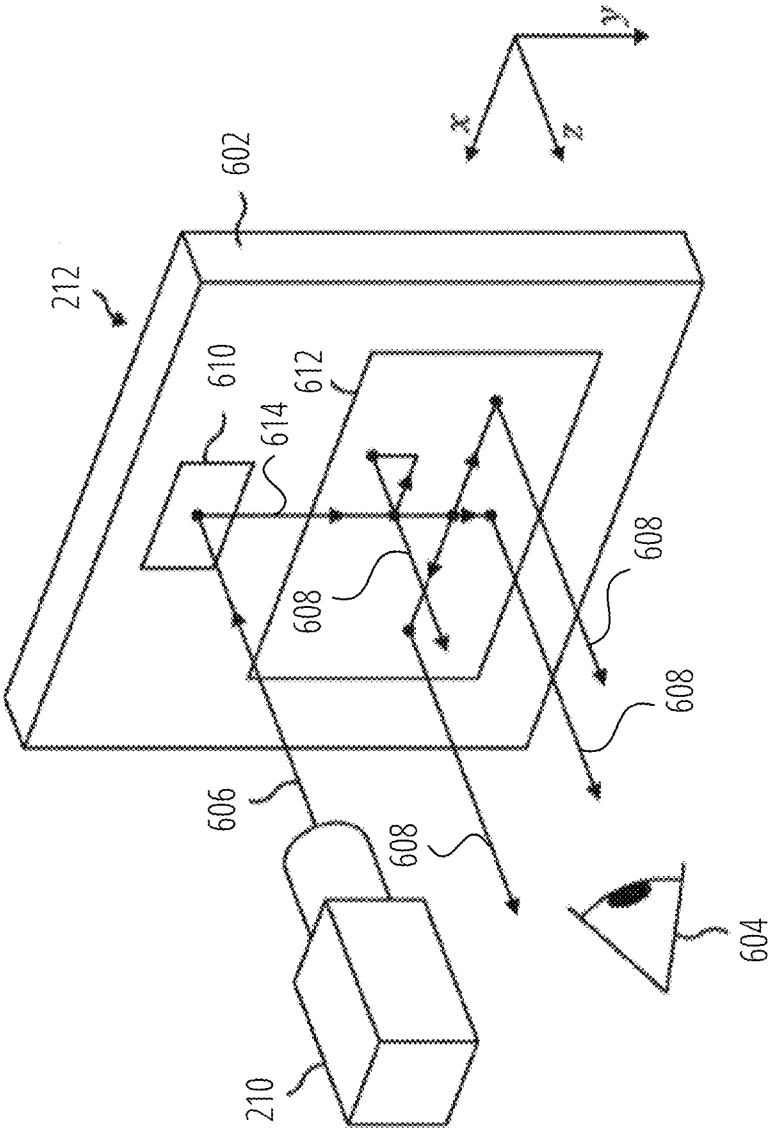
FIG. 6 illustrates a perspective view of the left projector, the light, and the left near eye display of FIG. 2, in accordance with some examples.

FIG. 6 shows a perspective view of the left projector 210, the projected light 606 (represented in FIG. 6 as a single ray), and the left display device 212 of FIG. 2. The corresponding elements for the right eye can have a similar construction and function.

The left display device 212 can include a waveguide 602 or light guide. The waveguide 602 can guide light via repeated total internal reflections from opposing light-guiding surfaces of the waveguide 602. In the configuration of FIG. 6, the waveguide 602 can be configured as a planar waveguide or a slab waveguide, such as disposed in the x-y plane. The light-guiding surfaces can be generally flat or planar surfaces that are parallel to each other and extend in the x-y plane. One of the light-guiding surfaces (e.g., the display surface) can face an eye 604 of the user. The other of the light-guiding surfaces can face away from the eye 604 of the user.

The waveguide 602 can include one or more diffractive and/or reflective structures, which can receive the projected light 606 from the left projector 210, redirect the projected light 606 internally within the waveguide 602, and extract the projected light 606 from the waveguide 602 to form exiting light 608. For example, the waveguide 602 can include one or more diffraction gratings and/or diffraction grating regions, such as a single diffraction grating structure that has individual regions that can function as if they were separate diffraction gratings. The waveguide 602 can include one or more reflective structures, such as mirrors, prisms, and/or reflective gratings. The waveguide 602 can include one or more transmissive structures, such as transmissive gratings. The waveguide 602 can optionally include one or more light-focusing (or collimating-changing) optical elements, such as lenses. Any or all of these structures or elements can be included on one or both light-guiding surfaces of the waveguide 602 or in an interior of the waveguide 602.

In the configuration of FIG. 6, the waveguide 602 can include an input grating 610, which can receive the projected light 606 from the left projector 210 and direct the projected light 606 into the waveguide 602 to form light 614. The waveguide 602 can include an output grating 612, which can receive the light 614, split and redirect the light 614 internally to extend over a relatively large area (compared to the input grating 610), and direct the light 614 out of the waveguide 602 to form the exiting light 608. The redirections and splitting can occur from multiple (sequential) interactions with a single diffraction grating, or from sequential interactions with different gratings that are disposed within the surface area of the output grating 612. For example, a light ray can be diffracted into the waveguide by the input grating 610 and be caused to totally internally reflect from one light-guiding surface of the waveguide 602 to the other in a direction toward the output grating 612. The light 614 may then interact with diffractive features of the output grating 612 on or within the waveguide. A portion of light 614 is diffracted laterally within the plane of the waveguide thereby replicating the image across the area of the output grating 612, due to multiple interactions with diffractive features that exist across the output grating 612. Another portion of light 614 is directed out of the waveguide by diffraction grating 612 toward the eye 604 as light 608. The interactions with the diffractive features of the output grating 612 can cause internal rays or internal light beams in the waveguide 602 to change direction within the waveguide 602. Eventually, the interactions with the diffractive features can cause the internal rays or internal light beams to exit the waveguide 602 to propagate toward the eye 604 of the user.

In some examples, the waveguide 602 can be configured to operate at infinite conjugates. For example, the left projector 210 may project light that forms an image infinitely far away, so that the light would appear in focus on a screen placed relatively far from the left projector 210. Similarly, the output grating 612 may direct the exiting light 608 toward the eye in such a manner that the image appears to be infinitely far away to the eye 604 of the user. For such an infinite-conjugate arrangement, angles in the space of the light that enters and exits the waveguide 602 can correspond uniquely to image locations in the image. For example, the propagation angles of the light can map uniquely to the propagation angles of the exiting light 608, which in turn can map uniquely to the image locations in the image at the retina of the eye 604 of the user.

The waveguide 602 can make use of this infinite-conjugate relationship to perform so-called "pupil replication" or "pupil expansion". The left projector 210 can be configured to have an exit pupil that coincides with the input grating 610. The internal splitting and redirections within the output grating 612 can effectively expand a surface area of the exit pupil, while maintaining the unique mapping of propagation angle to image location for light in the pupil, and thereby maintaining the unique mapping of virtual image surface location to image location. The size of the output grating 612 (e.g., an area covered by the replicated pupils, as constrained within a surface area of the output grating 612) can be larger than a pupil of the eye 604 of the user, so that if the pupil of the eye 604 moves, such as caused by the user changing a gaze direction, the amount of light entering the pupil of the eye 604 may not vary significantly, and the user may not perceive a change in brightness of the image.

Thus, in the context of a waveguide-based display, the mapping of image pixels to virtual image surface locations shown in FIG. 3 through FIG. 5 can be more specifically considered to be a mapping of light propagated from image pixels to light presented from a given display surface location at an angle that intersects the user's eye (or more specifically, the pupil of the user's eye). References herein to measuring or correcting the color mix of light presented from a given virtual image surface location may be understood, in the context of waveguide-based displays, to measuring or correcting the color mix of light presented from the given display surface location at an angle intersecting a point or region in space corresponding to a real or hypothetical pupil of an eye.

Figure 7:
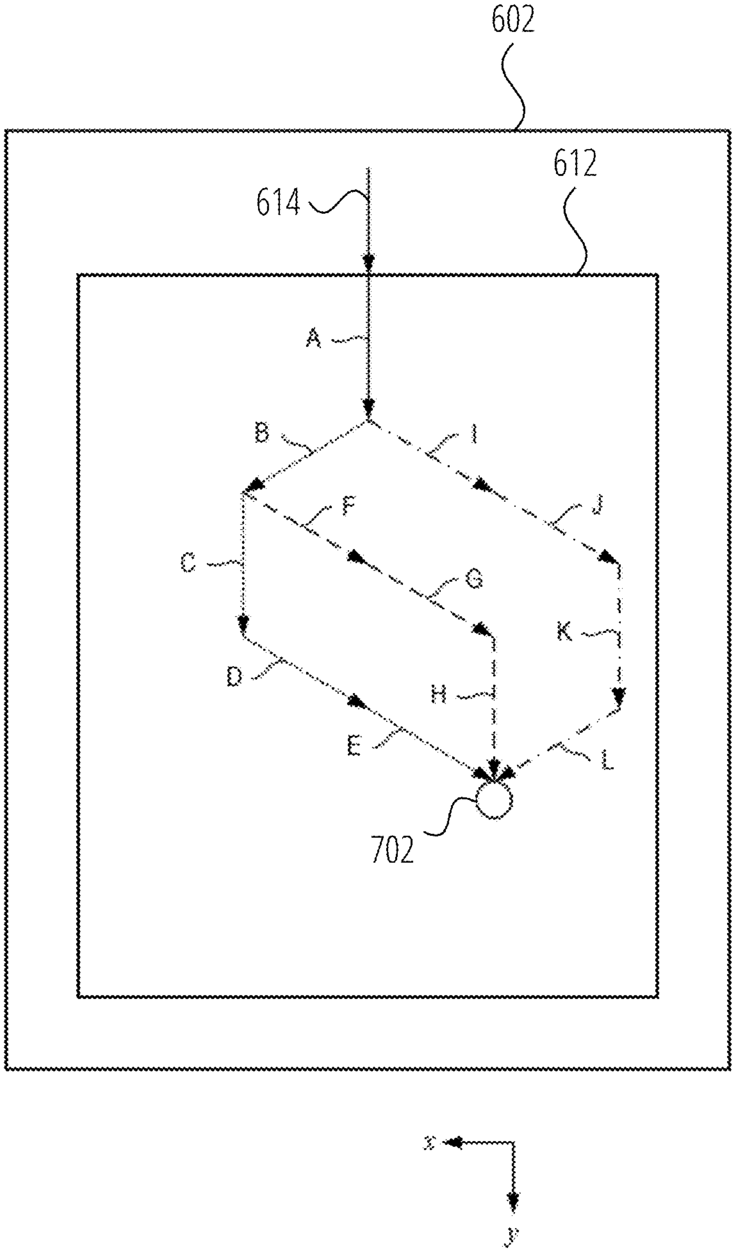
FIG. 7 illustrates a front view of the output grating of FIG. 6, with examples of optical paths traversed by light rays in the waveguide within a footprint or perimeter of the output grating, in accordance with some examples.

FIG. 7 shows a front view of the output grating 612 of FIG. 6, with examples of optical paths traversed by light rays in the waveguide 602 within a footprint or perimeter of the output grating 612. Light 614 in the waveguide 602 arrives from the input grating 610 (FIG. 3), propagates in the waveguide 602 to enter the perimeter of the output grating 612, splits and propagates in the waveguide 602 while within the perimeter of output grating 612, and exits the waveguide 602 and exits the output grating 612 at location 702.

Because the light splits within the perimeter of the output grating 612, the light may form multiple beams in the waveguide 602 while within the perimeter of the output grating 612. In the example of FIG. 7, a single beam splits to form two beams, and one of those two beams splits to form a further two beams, so that the single beam ultimately produces three beams in the waveguide 602 within the perimeter of the output grating 612. In FIG. 7, a first beam traverses segments A-B-C-D-E, a second beam traverses segments A-B-F-G-H, and a third beam traverses segments A-I-J-K-L. Segments A through L in FIG. 7 illustrate repetitions of propagation vectors in the waveguide 602. The segments A through L begin and end at locations at which the light beams interact with diffractive features of the output grating 612. Specifically, the first beam propagates within the waveguide 602 to location A, reflects from location A to remain within the waveguide 602, totally internally reflects from an opposing light-guiding surface of the waveguide, propagates within the waveguide 602 to location B, reflects and is diffracted from location B to remain within the waveguide 602, and so forth.

The multiple beams can recombine upon exiting the waveguide 602 and exiting the output grating 612 at location 702. In the example of FIG. 7, the three beams combine at location 702 and, together as a single beam of exiting light 608 (FIG. 6), propagate toward the eye 604 (FIG. 6) of the user. In some configurations, the guided light in the waveguide 602 (FIG. 6) can be a single wavelength or a range of wavelengths corresponding to standard light-emitting diode (LED) spectra, such as red, blue, or green LED spectra. (In practice, the display system 100 may use multiple waveguides to produce full-color images, such as a waveguide for guiding only red light, a waveguide for guiding only green light, and a waveguide for guiding only blue light. Such imaging systems may spectrally split the light from a single projector, or may use multiple projectors, each producing light at a different wavelength or color. Such imaging systems may combine the single-color light to form a full-color image. Individual waveguides for red, green and blue light may have different thicknesses such that each wavelength follows a similar walk path during internal reflection, leading to a near equal number of internal reflections per color.)

Because multiple beams of the same wavelength can recombine to form the exiting light 608 (FIG. 6), there can be interference effects among the multiple beams. Such interference effects are sensitive to changes in optical path length, with path length differences of greater than about one-eighth of a wavelength producing relatively large changes in output beam intensity. This sensitivity of output beam intensity to interference effects can be problematic, and can lead to non-uniformities in the image presented to the viewer. These non-uniformities can vary by wavelength of light (due to, e.g., varying sensitivity of different wavelengths of light to such path length differences), thereby giving rise to color non-uniformities as described above. For example, the sensitivity to optical interference may cause the device to show an exaggerated sensitivity to temperature that gives rise to color non-uniformity effects. As one example, a particularly hot electrical element may produce a hot spot in the surface area of the output grating 612. That hot spot may change the path length locally in one region of the output grating 612, so that optical paths near the hot spot may vary in optical path length, while other paths away from the hot spot may not vary. During use, as the electrical element heats and cools, the optical path length differences may change, and the resultant output light may increase or decrease in brightness (with such increases or decreases varying in degree for different light wavelengths) as the temperature of the electrical element rises or falls. As another example, the sensitivity to interference may place relatively tight manufacturing tolerances on the output grating 612, so that a manufacturer of the full display device may see part-to-part variations in brightness.

In some cases, interference effects and/or other design factors can cause light of different wavelengths to diffract out of different regions of the output grating 612 at varying levels of brightness, resulting not only in brightness non-uniformity but also color non-uniformity. In addition to interference effects that may affect different wavelengths of light differently at different regions of the area of the output grating 612, another factor that can cause color non-uniformity is the different outcoupling efficiency of regions of the output grating 612 with respect to different frequencies of light. For example, an output grating 612 may be designed such that its grating lines or other diffractive optical elements are spaced apart from each other at a fixed period, and/or having a particular shape, such that different wavelengths of light interact with the output grating 612 more or less often than each other, and/or are more or less likely to outcouple from the waveguide 602 during a given interaction with the output grating 612. In some examples, light having a relatively short wavelength (e.g., blue light) may experience more interactions with the output grating 612 per unit of optical path length traveled within the waveguide relative to light having a longer wavelength (e.g., red light). This may result in more of the blue light exiting the output grating 612 at high levels of brightness close to an input region of the output grating 612 (e.g., close to the input grating 610) becoming depleted by the distal end of the output grating 412, and red light exiting the output grating 612 more gradually as the light propagates through the waveguide 602 away from the input region.

Even in displays using multiple color-specific waveguides, each waveguide having a distinct output grating 612 optimized for the specific color of light propagating through the waveguide, color non-uniformity can result from factors such as the interference effects described above, part-to-part variations due to manufacturing variance, distortions caused by heat or mechanical deformation, undesired partial in-coupling of light of the wrong wavelength into a waveguide intended for a different wavelength, and so on.

Examples described herein attempt to correct for color non-uniformity in displays, such as see-through XR displays using waveguides.

Figure 8:
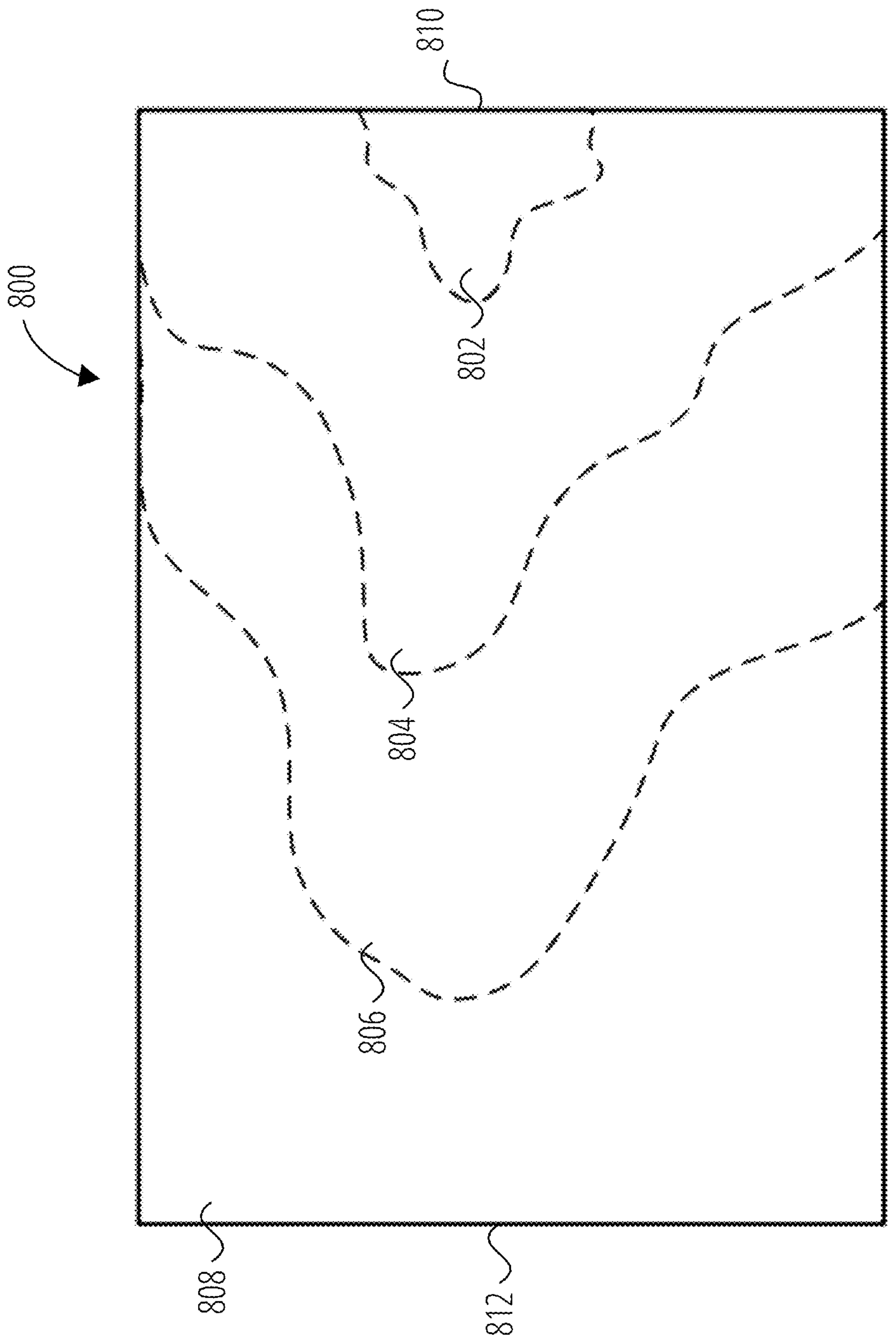
FIG. 8 illustrates an example distribution of red light emitted across a virtual image surface of an image presented by a waveguide of a display, in accordance with some examples.

FIG. 8 illustrates an example distribution of red light propagating toward a user's eye from virtual image surface locations across the virtual image surface. The non-uniformity of red light shown in FIG. 8 results from non-uniformity in the propagation of red light diffracting at different angles from different locations (e.g., different exit pupils) across a surface of a waveguide of a display. The red light distribution 800 shows bright red light region 802 in which the amount of red light emitted is above a first brightness threshold, a moderate red light region 804 in which the amount of red light emitted is between the first brightness threshold and a second brightness threshold, a dim red light region 806 in which the amount of red light emitted is between the second brightness threshold and a third brightness threshold, and a very dim red light region 808 in which the amount of red light emitted is below the third brightness threshold. The waveguide, and the virtual image surface, have an input side 810 close to an input grating or other light input or light source, and a distal side 812 distant from the light input: for example, in the illustration of FIG. 6, the input side 810 of the waveguide 602 would be along the top edge of the waveguide 602, and the distal side 812 would be along the bottom edge of the waveguide 602.

In FIG. 8, the amount of red light propagating from the virtual image surface is higher near the input side 810 than the distal side 812, but this effect is less pronounced than it is for light of shorter wavelengths (e.g., green and blue light). The pattern of diminishing red light is idiosyncratic to the behavior of light of the red light wavelength (e.g., the third wavelength, such as a wavelength in the red light range of 620 to 750 nm). When combined with other patterns of diminishment of light exiting the waveguide idiosyncratic to other light wavelengths, as shown in the examples of FIG. 9 and FIG. 10, color non-uniformity can result, as shown in FIG. 11.

Figure 9:
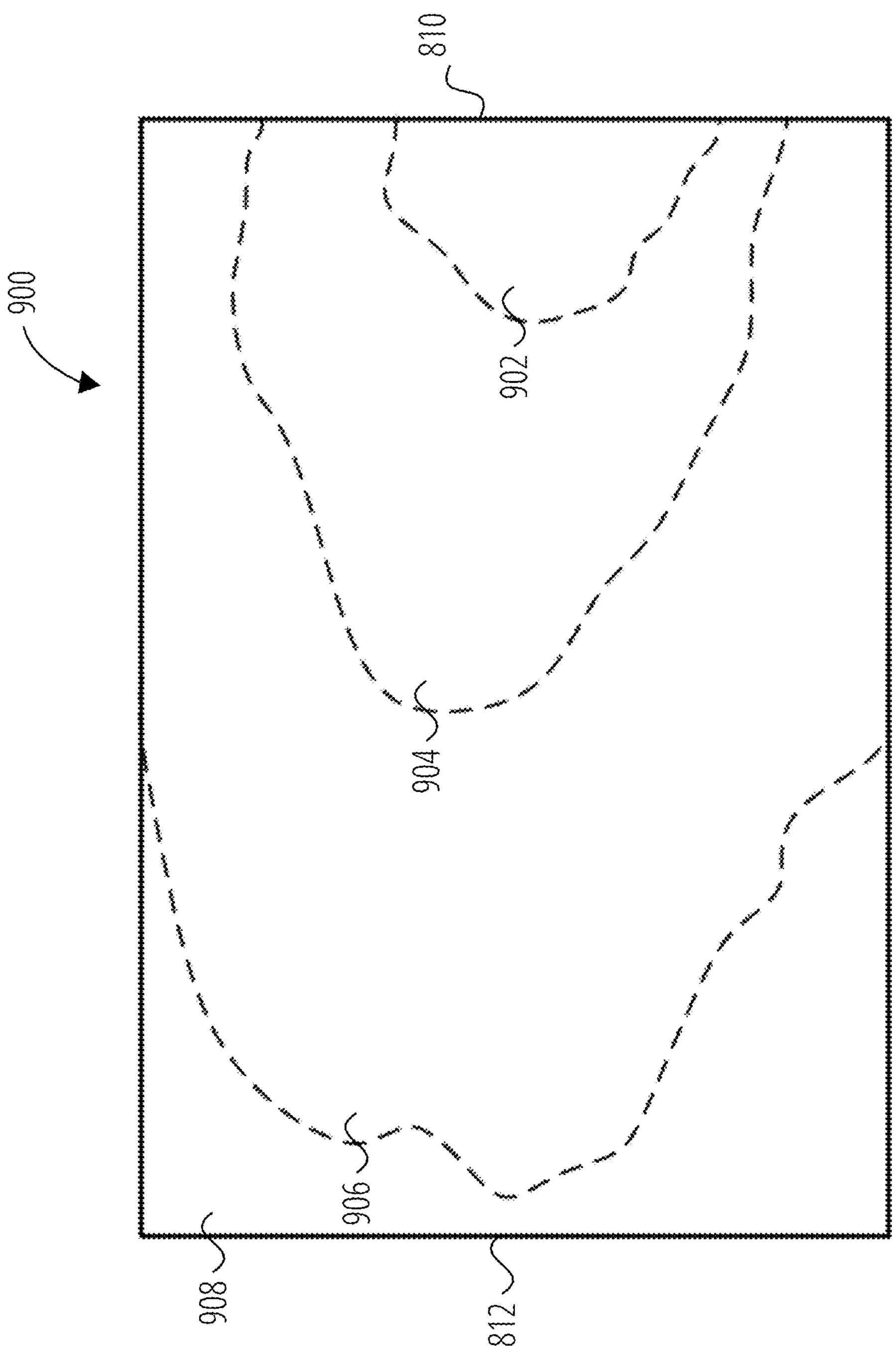
FIG. 9 illustrates an example distribution of green light emitted across a virtual image surface of an image presented by a waveguide of a display, in accordance with some examples.

FIG. 9 illustrates an example distribution of green light propagating toward a user's eye from virtual image surface locations across the virtual image surface. The non-uniformity of green light shown in FIG. 9 results from non-uniformity in the propagation of green light diffracting at different angles from different locations (e.g., different exit pupils) across a surface of a waveguide of a display. The green light distribution 900 shows bright green light region 902 in which the amount of green light emitted is above a first brightness threshold, a moderate green light region 904 in which the amount of green light emitted is between the first brightness threshold and a second brightness threshold, a dim green light region 906 in which the amount of green light emitted is between the second brightness threshold and a third brightness threshold, and a very dim green light region 908 in which the amount of green light emitted is below the third brightness threshold. The waveguide, and the virtual image surface, have an input side 810 and a distal side 812, as in FIG. 8.

In FIG. 9, the amount of green light propagating from the virtual image surface is higher near the input side 810 than the distal side 812, but this effect is less pronounced than it is for light of shorter wavelengths (e.g., blue light). The pattern of diminishing green light is idiosyncratic to the behavior of light of the green light wavelength (e.g., the second wavelength, such as a wavelength in the green light range of 500 to 570 nm).

Figure 10:
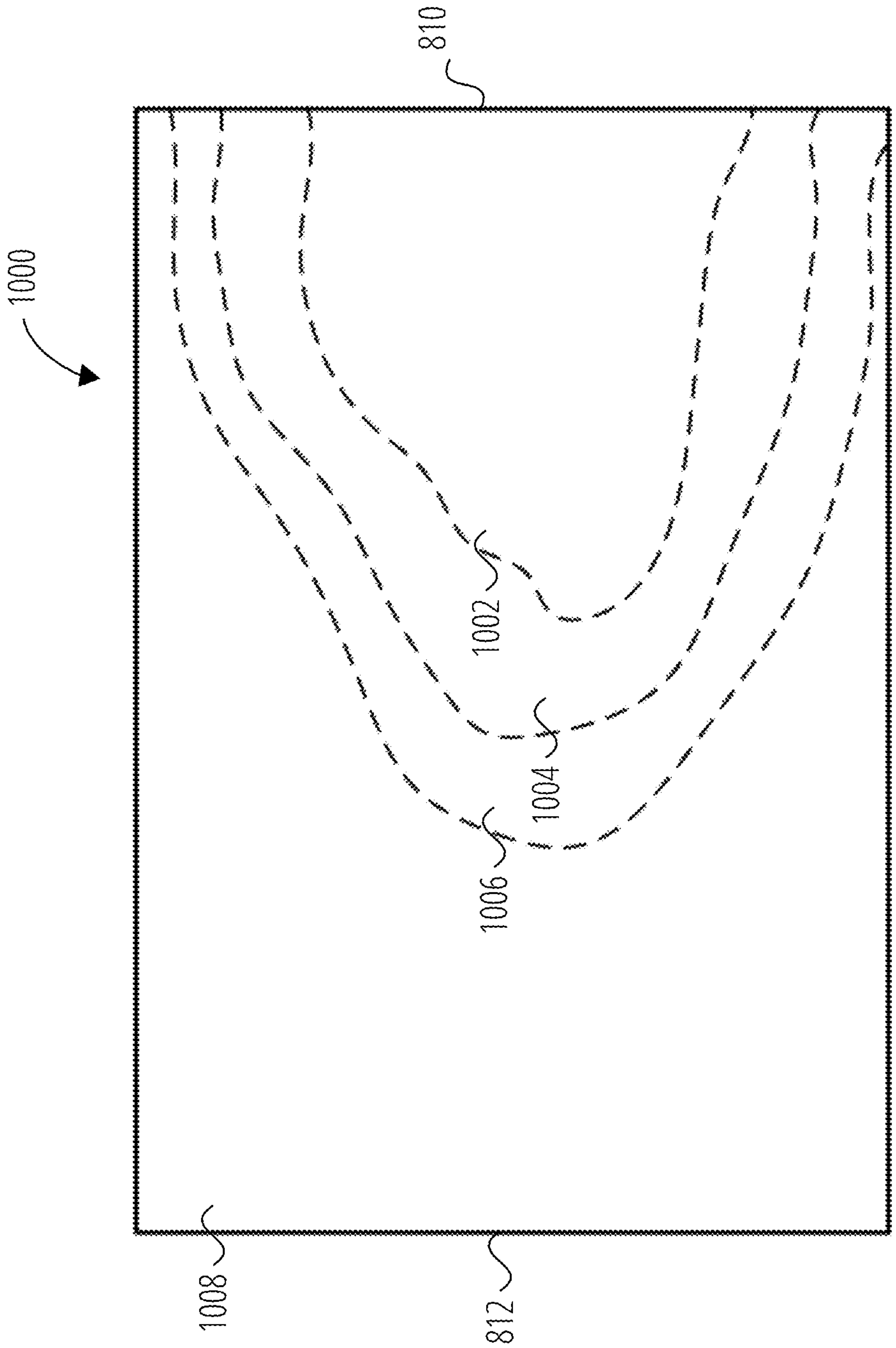
FIG. 10 illustrates an example distribution of blue light emitted across a virtual image surface of an image presented by a waveguide of a display, in accordance with some examples.
Figure 11:
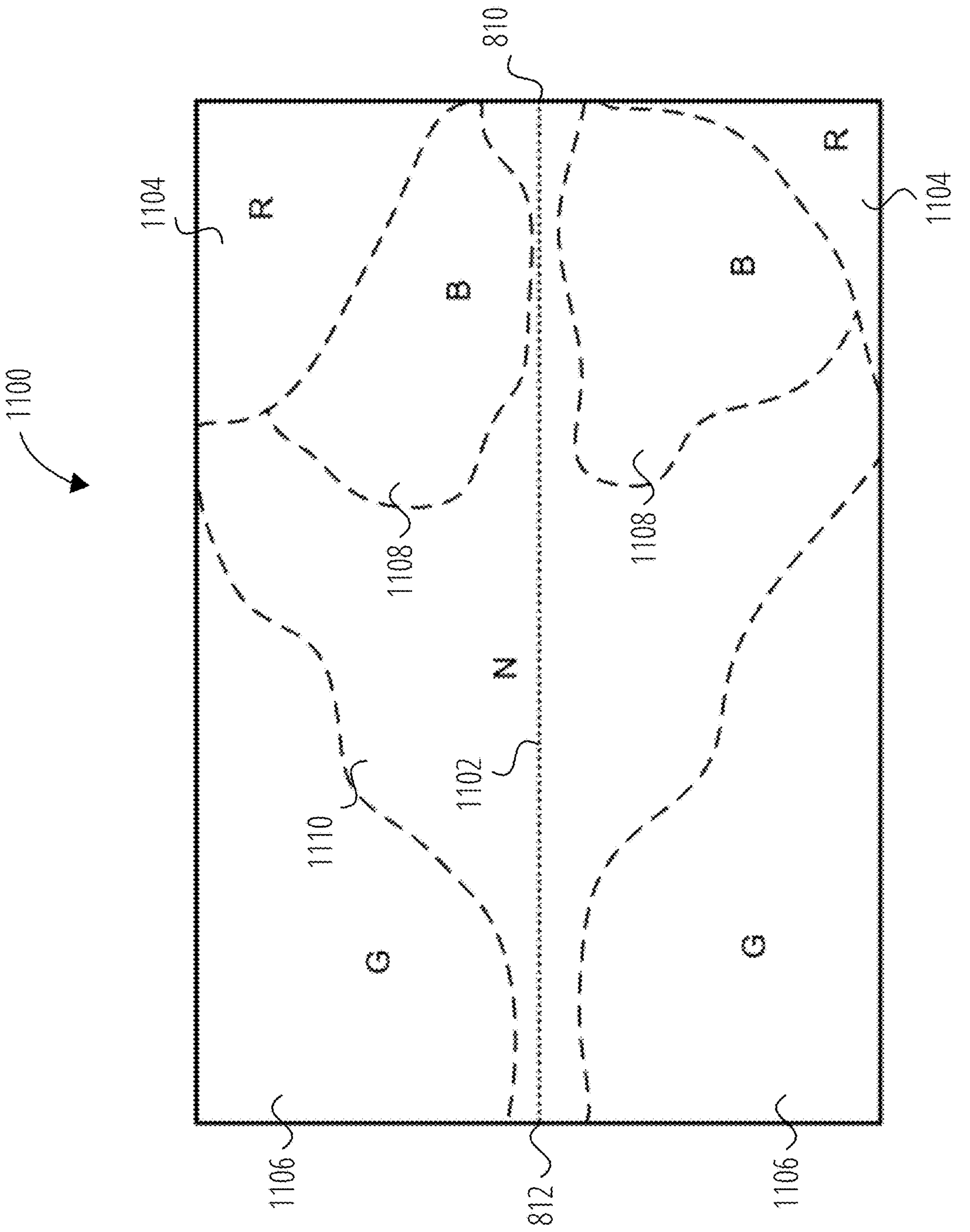
FIG. 11 illustrates an example distribution of predominant colors of light emitted across virtual image surface of an image presented by a waveguide of a display, in accordance with some examples.

FIG. 10 illustrates an example distribution of blue light propagating toward a user's eye from virtual image surface locations across the virtual image surface. The non-uniformity of blue light shown in FIG. 10 results from non-uniformity in the propagation of blue light diffracting at different angles from different locations (e.g., different exit pupils) across a surface of a waveguide of a display. The blue light distribution 1000 shows bright blue light region 1002 in which the amount of blue light emitted is above a first brightness threshold, a moderate blue light region 1004 in which the amount of blue light emitted is between the first brightness threshold and a second brightness threshold, a dim blue light region 1006 in which the amount of blue light emitted is between the second brightness threshold and a third brightness threshold, and a very dim blue light region 1008 in which the amount of blue light emitted is below the third brightness threshold. The waveguide, and the virtual image surface, have an input side 810 and a distal side 812, as in FIG. 8.

In FIG. 10, the amount of blue light propagating from the virtual image surface is higher near the input side 810 than the distal side 812. However, the pattern of diminishing blue light is idiosyncratic to the behavior of light of the blue light wavelength (e.g., the first wavelength, such as a wavelength in the blue light range of 450 to 495 nm).

FIG. 11 illustrates an example non-uniform RGB light distribution 1100 of predominant colors of light emitted across a virtual image surface. FIG. 11 can be considered to be the result of the example idiosyncratic red light distribution 800, green light distribution 900, and blue light distribution 1000 shown in FIG. 8 through FIG. 10.

The uneven distributions of red, green, and blue light across the virtual image surface locations result in regions of the virtual image surface having a white point of the image distorted or shifted within a color space. In the illustrated example, the non-uniform RGB light distribution 1100 includes a relatively neutral region 1110 with a white point close to the intended white point of the imaging system. The neutral region 1110 is concentrated near a centerline 1102 running from the input side 810 to the distal side 812: in some cases, a waveguide may introduce less distortion to light travelling a relatively straight path from the input side 810 to the distal side 812, but relatively more distortion to light diffracted to the sides of the centerline 1102, for the reasons described above with reference to FIG. 7.

To the sides of the centerline 1102, the non-uniform RGB light distribution 1100 includes predominantly red regions 1104 in the corners of the input side 810, predominantly blue regions 1108 concentrated closer to the centerline 1102 near the input side 810, and predominantly green regions 1106 close to the distal side 812 away from the centerline 1102. In each of these regions, the white point of the image as presented from the virtual image surface will deviate from the white point intended by the imaging system, shifted toward the respective dominant color of the region, unless color correction is performed to counteract or mitigate this color non-uniformity. (As used in herein, "color correction" refers to color non-uniformity correction unless otherwise specified.)

It will be appreciated that the regions shown in FIG. 11 are simplified examples. In some examples, the dominant color of the light exiting a given virtual image surface location will vary continuously across the virtual image surface, and the color mix of the emitted light may deviate from a desired white point in more than one dimension (e.g., in three dimensions of a color space, such as hue, value, and brightness).

To counteract or mitigate the color non-uniformity exhibited by the non-uniform RGB light distribution 1100, various color correction techniques may be used, as described below with reference to FIG. 12 through FIG. 15. In some examples, the overall brightness of light presented by the virtual image surface in the corner regions of the distal side 812 may be significantly lower than the brightness of the light presented by the virtual image surface in the corner regions of the input side 810. To compensate for the dimness of the resulting images in these distal corner regions, the magnitude of the electrical stimulus applied to emitters of all colors (or during all color sub-frame time periods) may be increased as part of the color non-uniformity correction techniques described herein.

Figure 12:
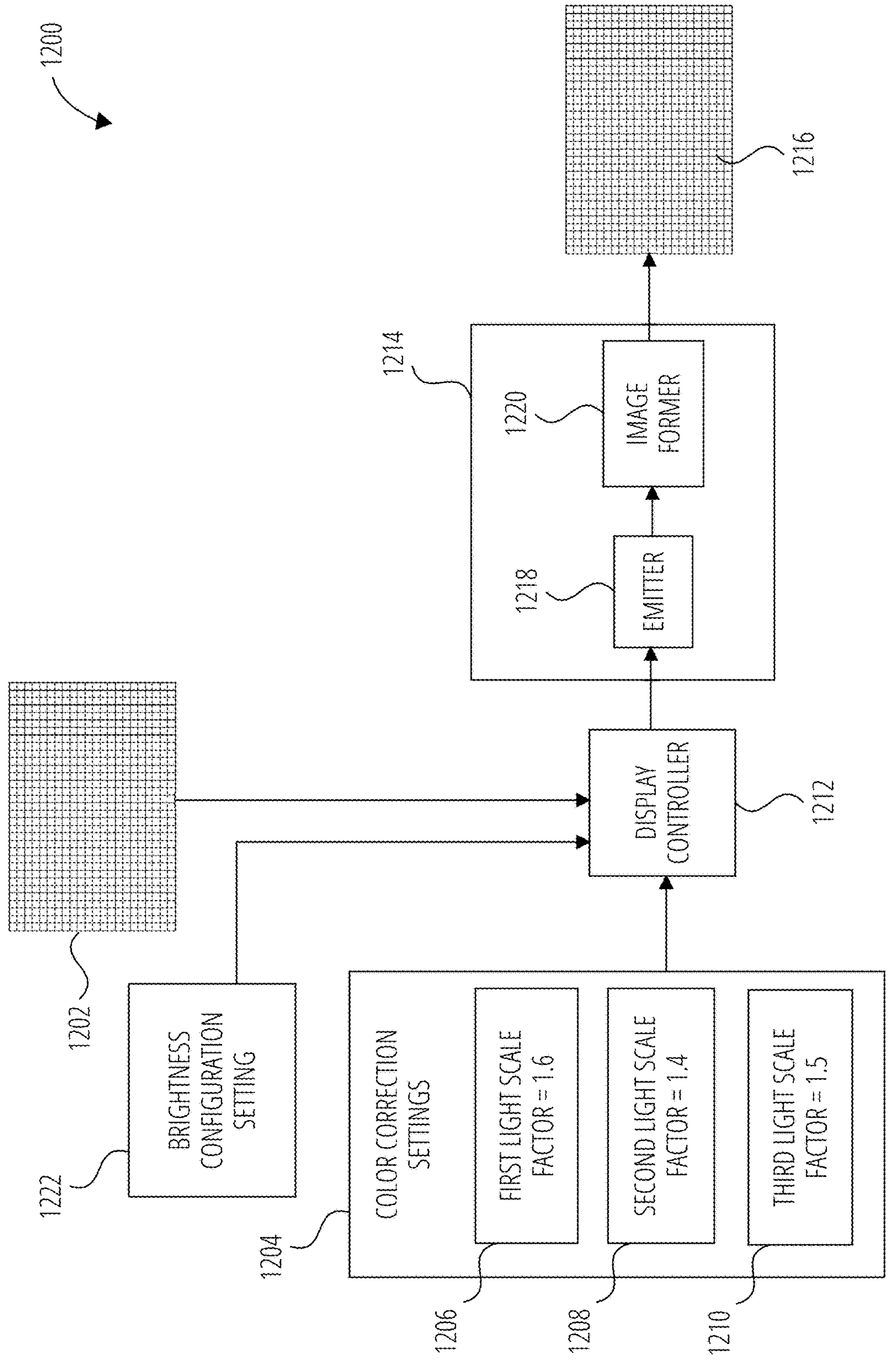
FIG. 12 illustrates a block diagram of a display system, in accordance with some examples.

FIG. 12 shows a block diagram of an example display system 1200. In some examples, the display system 1200 includes a display controller 1212, which can be implemented as electronic hardware logic or as a subsystem of a computing system, such as computer 120, machine 1600, or machine 1704, or a software subsystem of software architecture 1702. In some examples, the display system 1200 and display are parts of the same device.

The display system 1200 includes a set of color correction settings 1204 stored in a memory. The color correction settings 1204 include scale factors for each color of light emitted or propagated by the display. In the illustrated example, the scale factors are shown as a first light scale factor 1206 (stored as a scalar value of 1.6), a second light scale factor 1208 (stored as a scalar value of 1.4), and a third light scale factor 1210 (stored as a scalar value of 1.5). The scale factors used to scale the electrical stimuli can be configured to achieve a known change in light emission or propagation by the color elements. Thus, for example, if the relationship between a current stimulus to a color element (e.g., a blue LED) and the light emission of that element is known to follow a known mathematical relationship (e.g., a linear relationship), then the scale factor can be configured to effect a known mathematical change to the amount of light emitted by a given color element. The nature of the relationship between scaling the electrical stimulus and an increase or decrease in light propagation by a given color element can be taken into account in configuring the value of the scale factor.

In some examples, a brightness configuration setting 1222 is also stored in the memory. The brightness configuration setting 1222 may be determined based on one or more factors, such as user input (e.g., manually adjusting the brightness of the display) and/or an ambient light level of the environment detected by optical sensors (such as left camera 114 and/or right camera 116). Low ambient light levels may result in a lower value for the brightness configuration setting 1222, which will in turn be processed by the display controller 1212 to decrease the magnitude of the electrical stimulus applied to the emitter(s) of the display.

Image data 1202 defines an image to be presented by the display, subject to brightness and color correction. The image data 1202 can be received from a data source, retrieved from memory, or otherwise obtained by the display controller 1212. The image data 1202 may be any suitable image data format, such as a two-dimensional array of three-channel (e.g., RGB) pixel value data.

In this example, the display includes a display surface (not shown) and a projector 1214 for providing the light formed into the image that is propagated to the display surface to present the image from the virtual image surface. It will be appreciated that the display system 1200 can be used to control displays other than projectors, such as the display types described above (e.g., LCD or LED display panels). In this example, the projector 1214 includes at least one emitter 1218 as well as an image former 1220. However, as described above with reference to the example displays 300, 400, and 500 of FIG. 3 to FIG. 5, various different emitter configurations can be used with or without a separate image former 1220 (e.g., display 300 that combines the emitters and image former in an emitter pixel array) and with or without a color filter such as a color wheel (e.g., display 500 uses a color wheel and a white backlight emitter, whereas display 400 does not use a color wheel). In some examples, the emitters may be lasers, and the image former may be a laser beam scanning (LBS) mirror that forms the image by steering the laser beam over the angular field of vision while modulating the laser to achieve different gray levels. Such an LBS-based display system may propagate the beam-steered image to the user's eye using optics, such as a waveguide. The color uniformity correction techniques described herein can be used to adjust such an LBS-based display.

In operation, the display controller 1212 receives the image data 1202 encoding the image to be projected or otherwise propagated. The display controller 1212 retrieves from memory or otherwise receives the color correction settings 1204 and the brightness configuration setting 1222. The display controller 1212 processes these various data to generate magnitude values for the electrical stimulus for stimulating the at least one emitter 1218. In some examples, as described above, the magnitude of the electrical stimulus applied to the different colors of emitters (e.g., first color emitter 306*a* to third color emitter 310*a* of display 300) of different RGB pixels (e.g., pixels 304*a* to 304*d*) may be independently modulated. In some examples, the magnitude of the electrical stimulus applied to different colored backlight emitters (e.g., first color emitter 402 to third color emitter 406) can be independently modulated, e.g., during different color sub-frame time periods. In some examples, the magnitude of the electrical stimulus applied to a single backlight emitter (e.g., white light backlight emitter 502) can be modulated during different color sub-frame time periods.

As described in greater detail below with reference to FIG. 13 and FIG. 14, the display controller 1212 can be configured to apply a dynamically varying amount of color non-uniformity correction to the at least one emitter 1218. The amount of dynamic color non-uniformity correction applied to the emitter 1218 can be diminished as the brightness of the projected image increases. Thus, at low brightness levels, a large amount of color non-uniformity correction can be applied, thereby extending the brightness range of the display and correcting color non-uniformities of the displayed image when they are most likely to be noticeable to a user, e.g., in low ambient light conditions. At high brightness levels, a smaller amount of color non-uniformity correction can be applied, thereby potentially saving power at times when the display is consuming large amounts of power (to display a bright image) and when any color non-uniformities are less likely to be noticeable.

The magnitude of the electrical stimulus applied to the at least one emitter 1218, at each of one or more time periods (e.g., color sub-frame time periods), is determined by the display controller 1212 based on several factors. The pixel color values dictated by the image data 1202, optionally adjusted by the brightness configuration setting 1222, specify a baseline non-color-corrected set of pixel color values that may be used to determine a baseline magnitude of the electrical stimulus to apply to the at least one emitter 1218 at each of the one or more time periods. This magnitude can then be further adjusted by applying the color correction settings 1204 to correct for color non-uniformities. At maximum color correction, the magnitude (e.g., current) applied to the at least one emitter 1218 can be scaled by the full amount of the corresponding scale factor: for example, a set of blue pixel emitters, or a blue backlight emitter, or a white backlight emitter during a blue color sub-frame time period when the color wheel interposes a blue filter, can have its current stimulus scaled by the first light scale factor 1206, e.g., by a factor of 1.6. Similarly, the emitter 1218 corresponding to green light propagation can have its current stimulus scaled by the second light scale factor 1208, e.g., by a factor of 1.4, and the emitter 1218 corresponding to red light propagation can have its current stimulus scaled by the third light scale factor 1210, e.g., by a factor of 1.5. At maximum color correction, a lesser amount of color non-uniformity correction is applied, such as no scaling (e.g., the increase or decrease in scale applied by each scale factor is multiplied by a number less than one, such as zero, such that first light scale factor 1206, second light scale factor 1208, and third light scale factor 1210 are all effectively at values of 1.0). Intermediate levels of color correction can be applied by multiplying or otherwise scaling the degree of increase (or decrease) applied by the scale factors, e.g., at half color correction, the values of the scale factors may effectively be 1.3 for first light scale factor 1206, 1.2 for second light scale factor 1208, and 1.25 for third light scale factor 1210. The dynamic scaling applied to the scale factors may be linear or non-linear in proportion to the brightness measure or stimulus magnitude measure being used to determine the amount of color correction to apply. It will be appreciated that any other suitable means of scaling the scale factors can be used in various examples.

The simulation of the at least one emitter 1218 results in emission of light, which is formed into an image by the image former 1220 and propagated to the display surface for presentation as a color corrected projected image 1216 from the virtual image surface.

In some examples, the display controller 1212 can also vary the durations of the color sub-frame time periods in order to achieve different degrees of color non-uniformity correction.

In some examples, the image data 1202 may be pre-processed prior to applying the brightness configuration setting 1222 and color correction settings 1204 in order to mitigate one or more of the limitations identified herein. Colors or patterns in an image can be filtered or modulated if they are likely to give rise to highly visible color non-uniformities, result in very high power usage, or otherwise encounter difficulties in being displayed by the display system 1200. For example, if an image has properties that would make it difficult to display accurately on the display (e.g., on a waveguide-based display), the image data 1202 may be adjusted to make the image easier to display accurately. In a specific example, a filter could be applied to the image data that diminishes illumination in the corners of the image, thereby diminishing the need for color correction in the corners, which are often dimly illuminated even without such a filter. In another specific example, a filter could be applied to the image data that reduces high brightness features of the image, such as specular reflections, in order to reduce the visibility of monocular artifacts and/or binocular rivalry artifacts.

Figure 13:
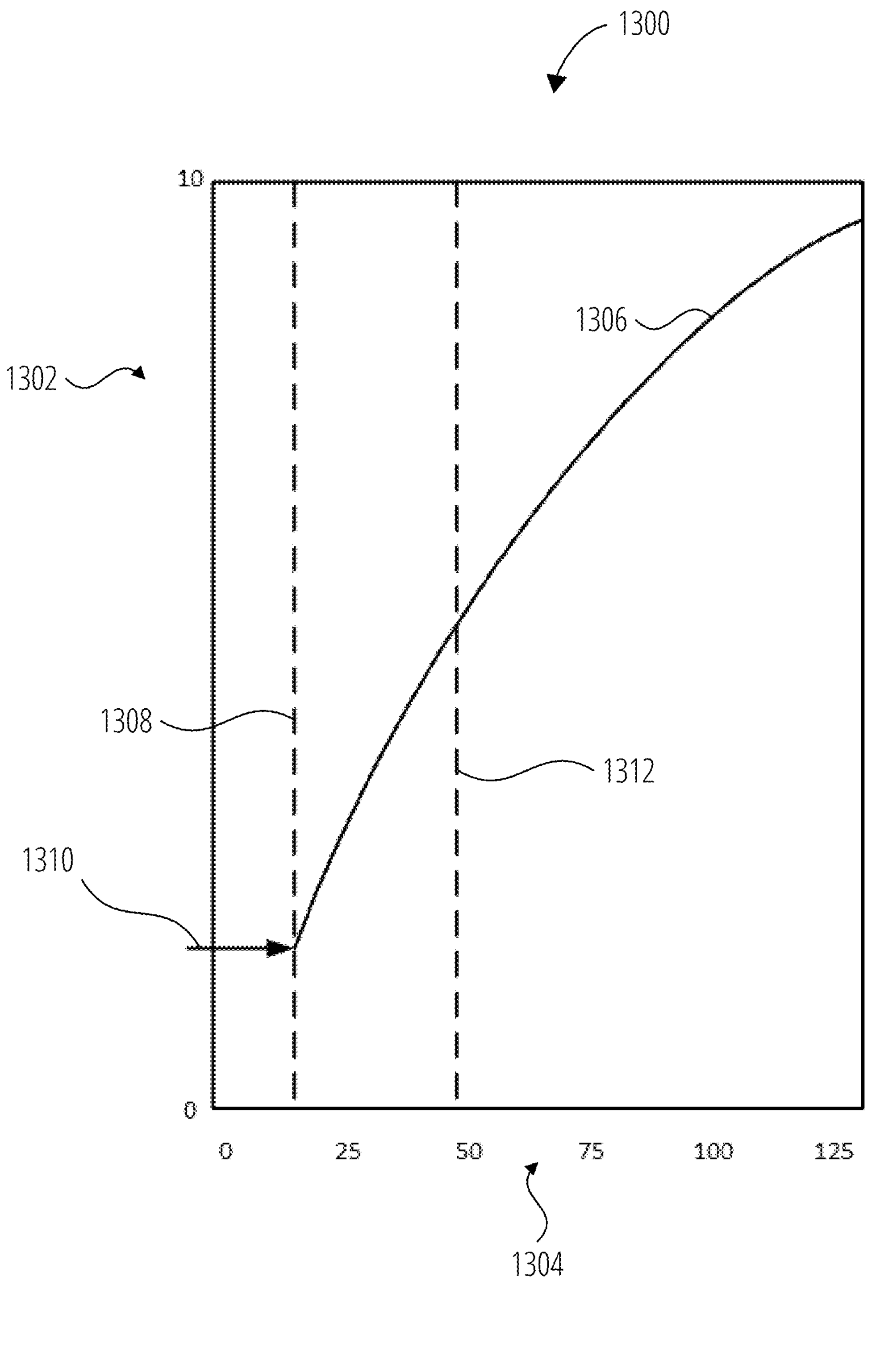
FIG. 13 illustrates a graph of brightness increasing with magnitude of a current stimulus applied to an emitter, in accordance with some examples.

FIG. 13 illustrates a graph 1300 of brightness 1302 increasing with the magnitude of current 1304 applied to an emitter. A light emission curve 1306 shows that the brightness 1302 of the light emitted by the emitter (shown as an amount light emitted by, e.g., a blue LED) increases as the magnitude of the current 1304 (shown in milliamps (mA)) increases.

In this example, the LED emitter is constrained by a minimum LED current requirement, which defines a minimum LED current 1308. Below this current, the LED emitter does not function properly. Thus, once the magnitude of the current 1304 drops below the minimum LED current 1308, a conventional display controller would decrease the magnitude of the current 1304 applied to the emitter to zero. One consequence of this minimum LED current 1308 constraint is that the LED emitter cannot emit brightness values below a minimum uncorrected LED brightness 1310 corresponding to the minimum LED current 1308. In some examples, the emitter may be a non-LED emitter that also has a minimum current that must be used to drive it in order for the emitter to function properly, such as a laser that requires a minimum current in order to lase. The minimum current required by an emitter can be considered to play the same functional role as the minimum LED current 1308.

A color correction current threshold 1312 is also shown in FIG. 13. When color non-uniformity correction is applied to the emitter, this 1312 may determine the degree of color correction applied, as described in greater detail below with reference to FIG. 14.

Figure 14:
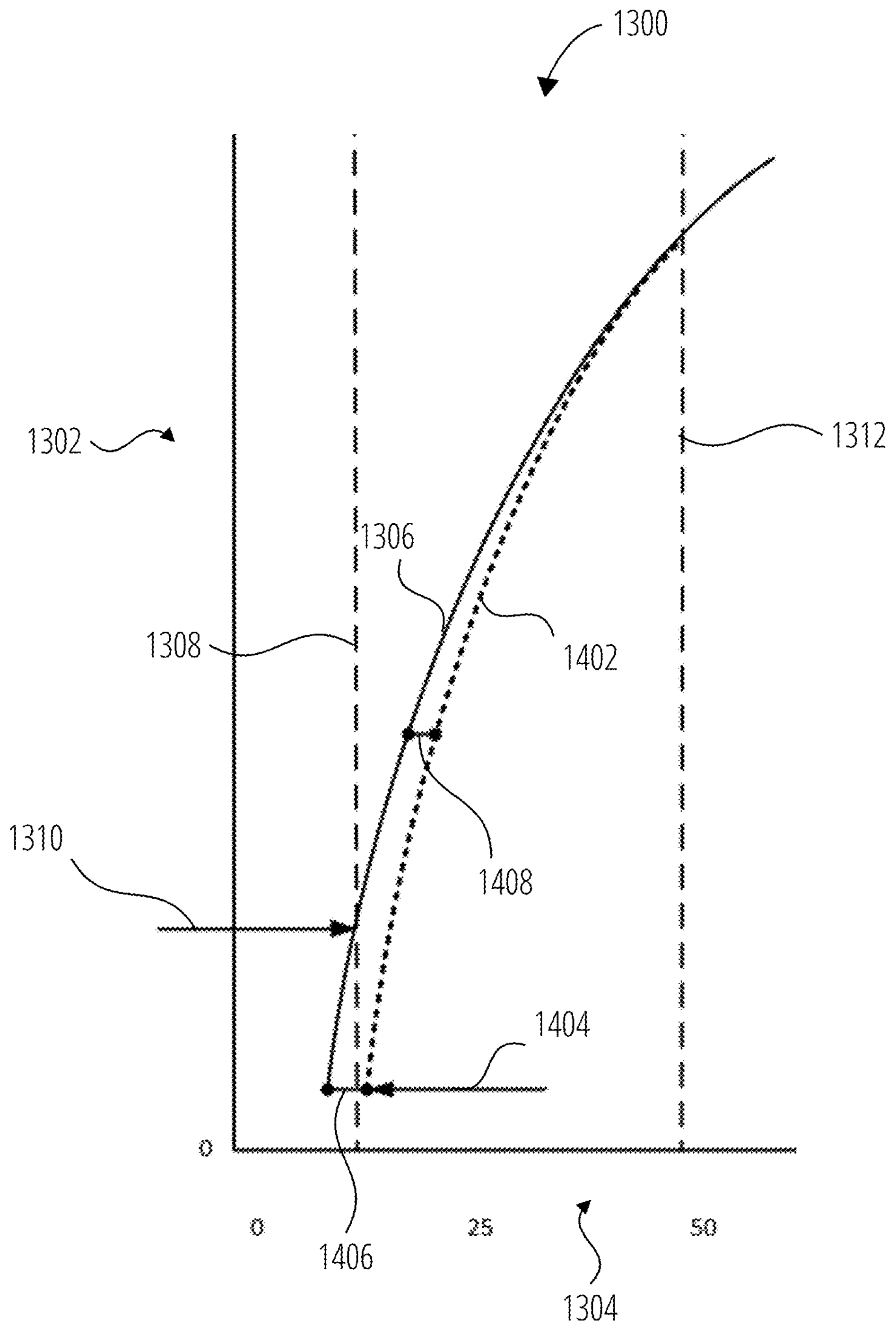
FIG. 14 illustrates a close-up view of a portion of the graph of FIG. 13 showing dynamic color non-uniformity correction being applied, in accordance with some examples.

FIG. 14 illustrates a close-up view of a portion of the graph 1300 of FIG. 13, with the light emission curve 1306 extended below the minimum LED current 1308 and also showing a color corrected light emission curve 1402 representing the current 1304 applied to the emitter, and the resulting brightness 1302, when dynamic color non-uniformity correction is applied to the LED emitter in accordance with examples described herein.

In this example, the magnitude of the current 1304 applied to the LED emitter is adjusted in accordance with one of the scale factors described above (e.g., first light scale factor 1206 applicable to blue light emission). In the illustrated example, all brightness 1302 values corresponding to current 1304 values below the color correction current threshold 1312 have a non-zero amount of color non-uniformity correction applied to the display. The amount applied decreases as the magnitude of the current 1304 approaches the color correction current threshold 1312. Above the color correction current threshold 1312, the amount of color non-uniformity correction applied is a minimum amount, such as zero (no color non-uniformity correction). However, in some examples, no color correction current threshold 1312 is defined, and a non-zero amount of color non-uniformity correction may be applied up to a maximum current 1304 at which the emitter may be driven.

At very low brightness 1302 levels, such as brightness 1302 below the minimum uncorrected LED brightness 1310 (corresponding to current below the minimum LED current 1308 magnitude), a maximum amount of color non-uniformity correction can be applied. In some examples, the maximum amount of color non-uniformity correction is achieved by scaling the current stimulus applied to the blue light emitter by the full amount of the first light scale factor 1206 (e.g., 1.6). This current scaling is shown in FIG. 14 as first current increase 1406. A consequence of this current scaling is that brightness 1302 levels below the minimum uncorrected LED brightness 1310 can be achieved, thereby extending the lower end of the brightness range of the emitter from minimum uncorrected LED brightness 1310 to minimum corrected LED brightness 1404, because the minimum corrected LED brightness 1404 is achieved with a current 1304 magnitude that is greater than the minimum LED current 1308.

As the magnitude of the current 1304 increases (thereby also increasing brightness 1302), the amount of color non-uniformity correction applied to the emitter is reduced, until the amount of color non-uniformity correction applied is a minimum amount (e.g., zero) at the color correction current threshold 1312. This decrease in color non-uniformity correction in relation to current 1304 (or brightness 1302) over the range from minimum to maximum color non-uniformity correction can be linear or non-linear. In the illustrated example, the decrease in color non-uniformity correction as current 1304 increases can be seen in second current increase 1408, at a higher current 1304 magnitude than first current increase 1406, second current increase 1408 being smaller than first current increase 1406 and therefore representing a smaller amount of current scaling than the first current increase 1406.

In some examples, such as the example of FIG. 14, no dynamic color non-uniformity correction is applied when the current 1304 is above the color correction current threshold 1312. This allows the display to conserve power and generate less heat when driving a high-brightness image, such as an AR image presented on a transparent waveguide under high ambient lightning conditions. Under such conditions, color correction may be less important to the color fidelity of the image than in low-brightness conditions. For example, the dim corners of the distal side 812 of the waveguide may not emit any light when the brightness 1302 of the projected image 1216 is low; in such circumstances, it may be important to apply a relatively large amount of dynamic color non-uniformity correction to scale the magnitude of the current 1304 upward in order to ensure that those corners of the image are visible.

In some examples, the magnitude of the electrical stimulus (e.g., current 1304) is the only measure of light emission accessible to the display controller 1212, and the color correction settings 1204 are predefined (e.g., based on a testing and calibration process performed during manufacturing of the display at a factory). Therefore, in such examples, the amount of dynamic color non-uniformity correction applied by the display controller 1212 is determined based on the current 1304 in combination with the brightness configuration setting 1222 and the color correction settings 1204. However, in some examples, the display controller 1212 may have access to data representative of the brightness 1302 (e.g., as measured by optical sensors sensing light emitted by the virtual image surface). In some such examples, the amount of dynamic color non-uniformity correction applied by the display controller 1212 can also take the actual measured brightness 1302 into account as a factor.

Figure 15:
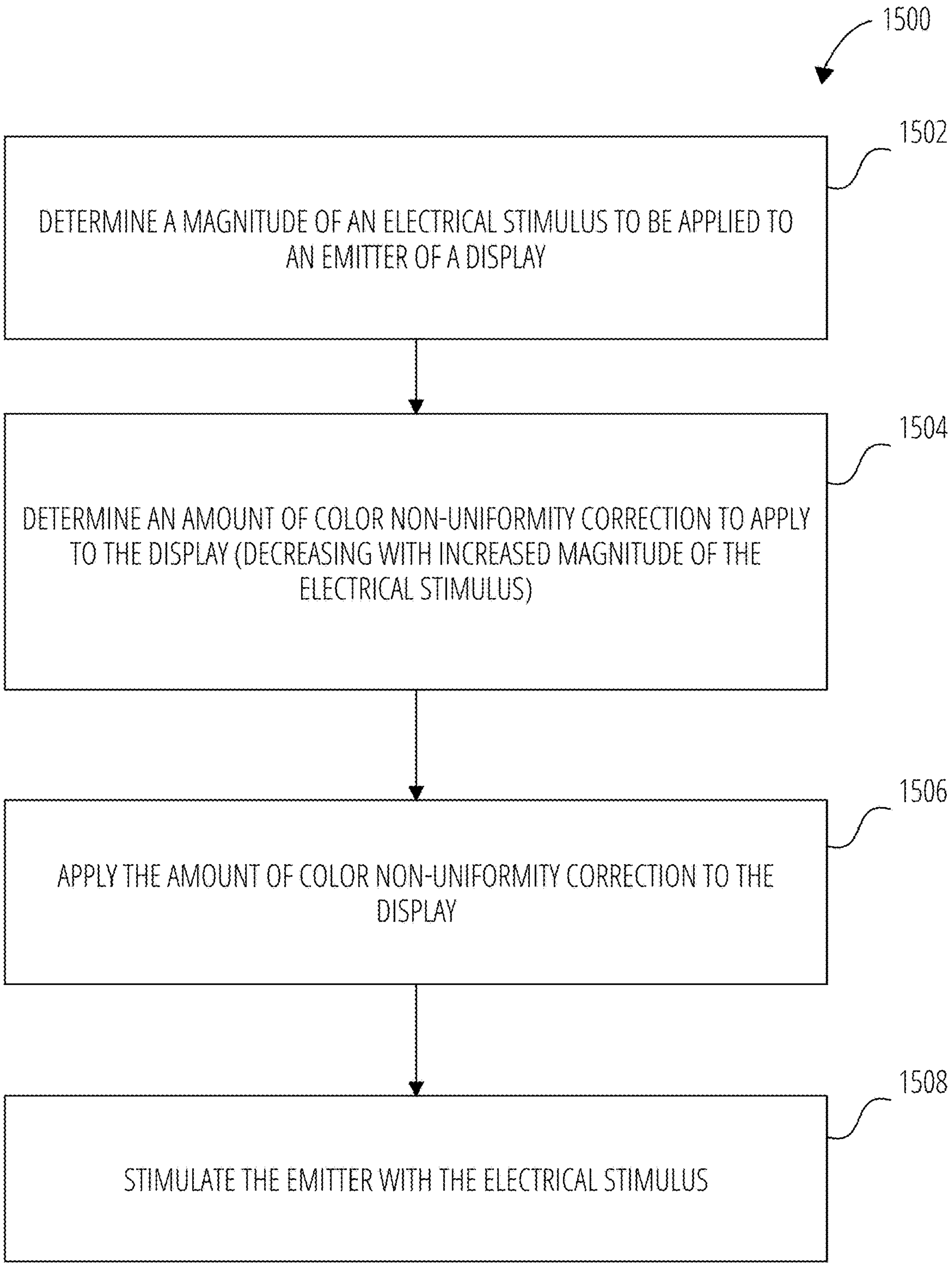
FIG. 15 illustrates a flowchart showing operations of a method for dynamic color correction of a display system, in accordance with some examples.

FIG. 15 illustrates a method 1500 for dynamic color correction of a display system.

The method 1500 is described as being implemented by the display system 100 using the display system 1200. However, it will be appreciated that the operations of method 1500 can be implemented or performed, in some cases, by other suitable systems or devices.

Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

According to some examples, the method 1500 includes determining a magnitude of an electrical stimulus to be applied to an emitter of a display at operation 1502. In some examples, the display controller 1212 receives the image data 1202 and determines a baseline magnitude of the electrical stimulus (e.g., current 1304) to apply to each of one or more emitters based on the image data 1202 alone. In some examples, the baseline magnitude of the electrical stimulus based on the image data 1202 may be adjusted based on the brightness configuration setting 1222.

According to some examples, the method 1500 includes determining an amount of color non-uniformity correction to apply to the display at operation 1504. The amount of color non-uniformity correction decreases with increased magnitude of the electrical stimulus, for example, in accordance with the example described above with reference to FIG. 14.

According to some examples, the method 1500 includes applying the amount of color non-uniformity correction to the display at operation 1506. In some examples, applying the amount of color non-uniformity correction determined at operation 1504 includes determining a degree of color non-uniformity correction to apply, the degree being a value between 0 and 1. This degree of color non-uniformity correction is then used to modify the scale factor for each color of emitter, such that a degree of color non-uniformity correction of zero results in each color being scaled (e.g., multiplied) by a value of 1.0 and a degree of color non-uniformity correction of one results in each color being scaled by the full value of the corresponding scale factor (e.g., first light scale factor 1206 of 1.6 for blue light emitters, second light scale factor 1208 of 1.4 for green light emitters, and third light scale factor 1210 of 1.5 for red light emitters). The magnitude of the electrical stimulus applied to each emitter of the corresponding color is scaled (e.g., multiplied) by the corresponding value. In some examples, the durations of one of more color sub-frame time periods may also be adjusted, requiring compensatory adjustments to the current for the various color emitters in order to maintain the desired color balance.

In some examples, a single aggregate brightness or electrical stimulus magnitude measure is obtained across all colors of light, and the degree of dynamic color non-uniformity correction to be applied is determined based on this aggregate brightness or electrical stimulus magnitude measure. For example, the magnitude of current applied to each of three colored backlight emitters can be combined (e.g., by an averaging function, or by a minimum function that identifies the lowest of the three current values) to generate an aggregate measure of current. Each color of emitter then has its current scaled by this shared aggregate measure. In other examples, the set of RGB pixels of a display may all have their color values (or current magnitudes) combined (e.g., by an averaging function, or by a function that determines the 20th percentile value of the set of values) across the entire display to generate an aggregate color value or aggregate current value.

In some examples, each color of emitter uses a distinct measure of brightness or current to determine the degree of dynamic color non-uniformity correction to be applied to that color of emitter. Thus, for example, three R/G/B backlight LEDs can each have a different degree of dynamic color non-uniformity correction applied based on their respective current magnitudes. In other examples, an array of RGB pixels can use three distinct aggregate brightness or current values generated based on combining the brightness or current values of the set of red emitters, combining the brightness or current values of the set of green emitters, and combining the brightness or current values of the set of blue emitters, respectively.

In some examples, operation 1504 may be performed by the display controller 1212 using a dynamic scaling module that adjusts the color uniformity correction factors in real-time, based on the magnitude of the electrical stimulus determined for each emitter. The dynamic scaling module could be configured to store multiple profiles corresponding to different ambient lighting conditions, user preferences, and/or content types, allowing the display controller 1212 to select the most appropriate color uniformity correction profile for the current operating context.

In some examples, the adjustments to the durations of color sub-frame time periods can be combined with the scaling of the currents of different colors of emitters by first determining three separate degrees of dynamic color non-uniformity correction to be applied (one for each color of emitter), adjusting the relative durations of the three color sub-frame time periods such that higher-brightness colors may have longer color sub-frame time period durations at a reduced current level, whereas lower-brightness colors have shorter color sub-frame time period durations at an increased current level. This approach may preserve the advantage of increasing the LED current at low current levels for dim colors to extend brightness range, while simultaneously reducing power draw at high current levels (but maintaining perceived brightness due to longer color sub-frame duration).

In some examples, the method 1500 could also include a step or sub-step wherein the display controller 1212 adjusts the degree(s) color uniformity correction based on feedback received from an ambient light sensor, thereby ensuring that the color correction is optimized for the current environmental lighting. In some examples, this adjustment is accomplished by adjusting the brightness configuration setting 1222 based on the ambient light sensor output.

In some examples, the operation 1504 may involve the display controller 1212 computing and applying different color uniformity correction scaling factors to different regions of the display, based on localized measurements of color non-uniformity. For example, a RGB microLED display or another display type using an array of RGB pixels may be able to spatially modulate current scaling, instead of or in addition to the spatially-neutral techniques described herein. For example, a pixel shading map may be generated during factory calibration and applied to adjust the image data 1202 to improve color balance. In color-sequential display types using a separate image former such as a transmissive or reflective liquid crystal panel, the transmissivity and/or reflectivity of individual liquid crystal elements can be modulated based on the pixel shading map during different color sub-frames.

According to some examples, the method 1500 includes stimulating the emitter with the electrical stimulus at operation 1508 from the virtual image surface. This stimulation results in the emission of light of the corresponding color and propagation of this light to a display surface for presentation of an image to a viewer.

It will be appreciated that, whereas the operations of method 1500 are presented in order from operation 1502 to operation 1508, in some examples the dynamic color non-uniformity correction operation 1506 is performed before and/or during the emitter stimulation operation 1508. In some examples, the operations of method 1500 are performed continuously and concurrently while presenting an image or a sequence of images from the display.

The method 1500 may further include a step (not shown) where, prior to applying the color non-uniformity correction, a calibration process is performed (e.g., at a factory) to establish a baseline color uniformity profile for the display under standard operating conditions, including, e.g., the color correction settings 1204.

Machine Architecture

Figure 16:
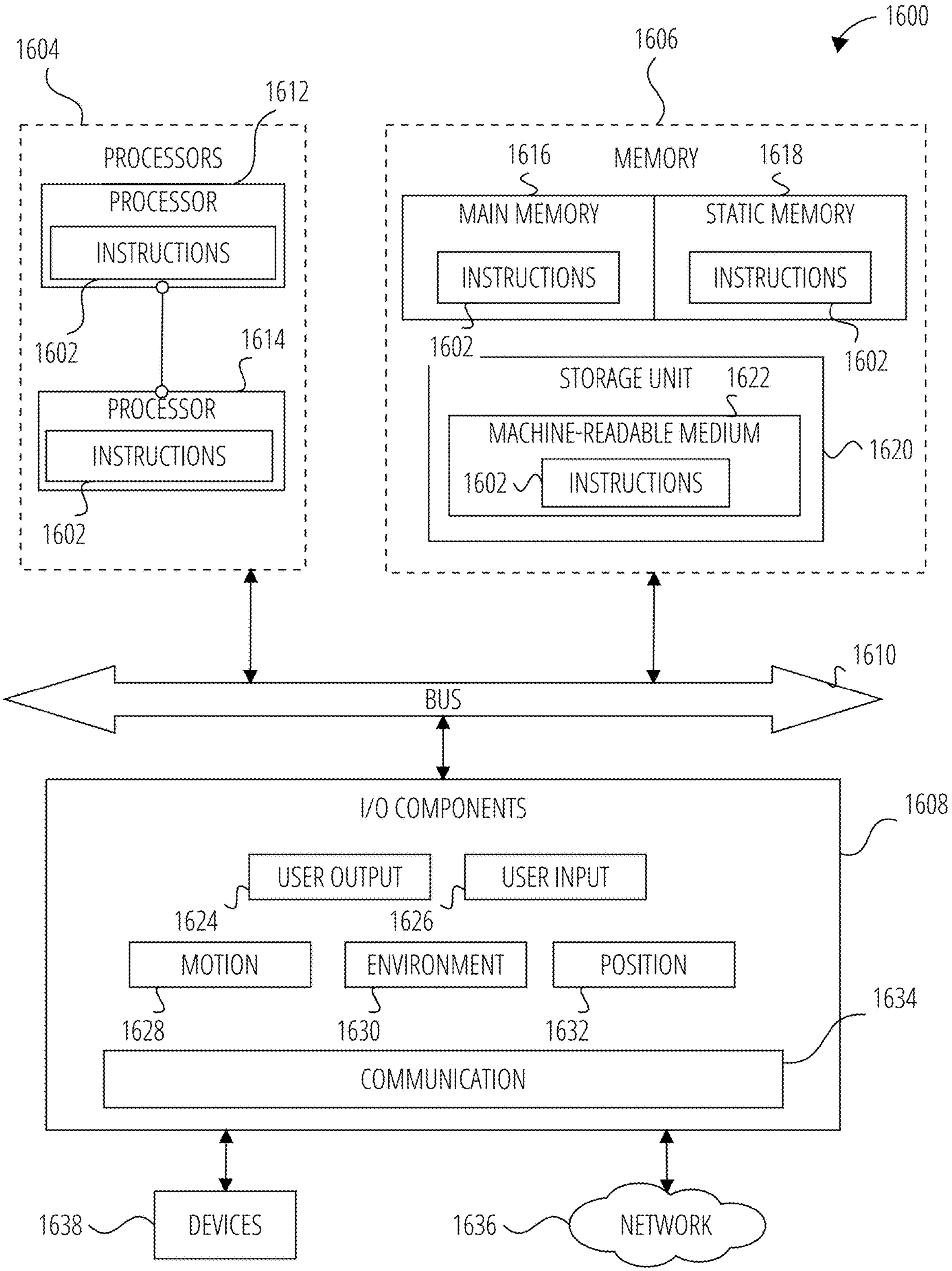
FIG. 16 is a diagrammatic representation of a machine in the form of a computer system within which a set of instructions may be executed to cause the machine to perform any one or more of the methodologies discussed herein, in accordance with some examples.

FIG. 16 is a diagrammatic representation of a machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute the method 1500 described herein and/or to implement the display system 1200. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. In some examples, the machine 1600 may comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, all accessible to the processors 1604 via the bus 1610. The main memory 1606, the static memory 1618, and the storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include or communicate with visual components (e.g., one or more displays such as the left near-eye display and right near-eye display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1608 may include motion components 1628, environmental components 1630, or position components 1632, among a wide array of other components.

The motion components 1628 include acceleration sensor components (e.g., accelerometer), gravitation sensor components, rotation sensor components (e.g., gyroscope).

The environmental components 1630 include, for example, one or more externally-facing cameras (with still image/photograph and video capabilities) such as left camera 114 and right camera 116, illumination sensor components (e.g., photometer or ambient light sensor), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

Further, the camera system of the machine 1600 may include dual rear cameras (e.g., a primary camera as well as a depth-sensing camera), or even triple, quad or penta rear camera configurations on the front and rear sides of the machine 1600. These multiple cameras systems may include a wide camera, an ultra-wide camera, a telephoto camera, a macro camera, and a depth sensor, for example. In some examples, one or more of the cameras can be used as an ambient light sensor.

The position components 1632 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1608 further include communication components 1634 operable to couple the machine 1600 to a network 1636 or devices 1638 via respective coupling or connections. For example, the communication components 1634 may include a network interface component or another suitable device to interface with the network 1636. In further examples, the communication components 1634 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1638 may be another machine or any of a wide variety of peripheral devices (e.g., a peripheral device coupled via a USB).

Moreover, the communication components 1634 may detect identifiers or include components operable to detect identifiers. For example, the communication components 1634 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1634, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples, including method 1500 and/or display system 1200.

The instructions 1602 may be transmitted or received over the network 1636, using a transmission medium, via a network interface device (e.g., a network interface component included in the communication components 1634) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1638.

Software Architecture

Figure 17:
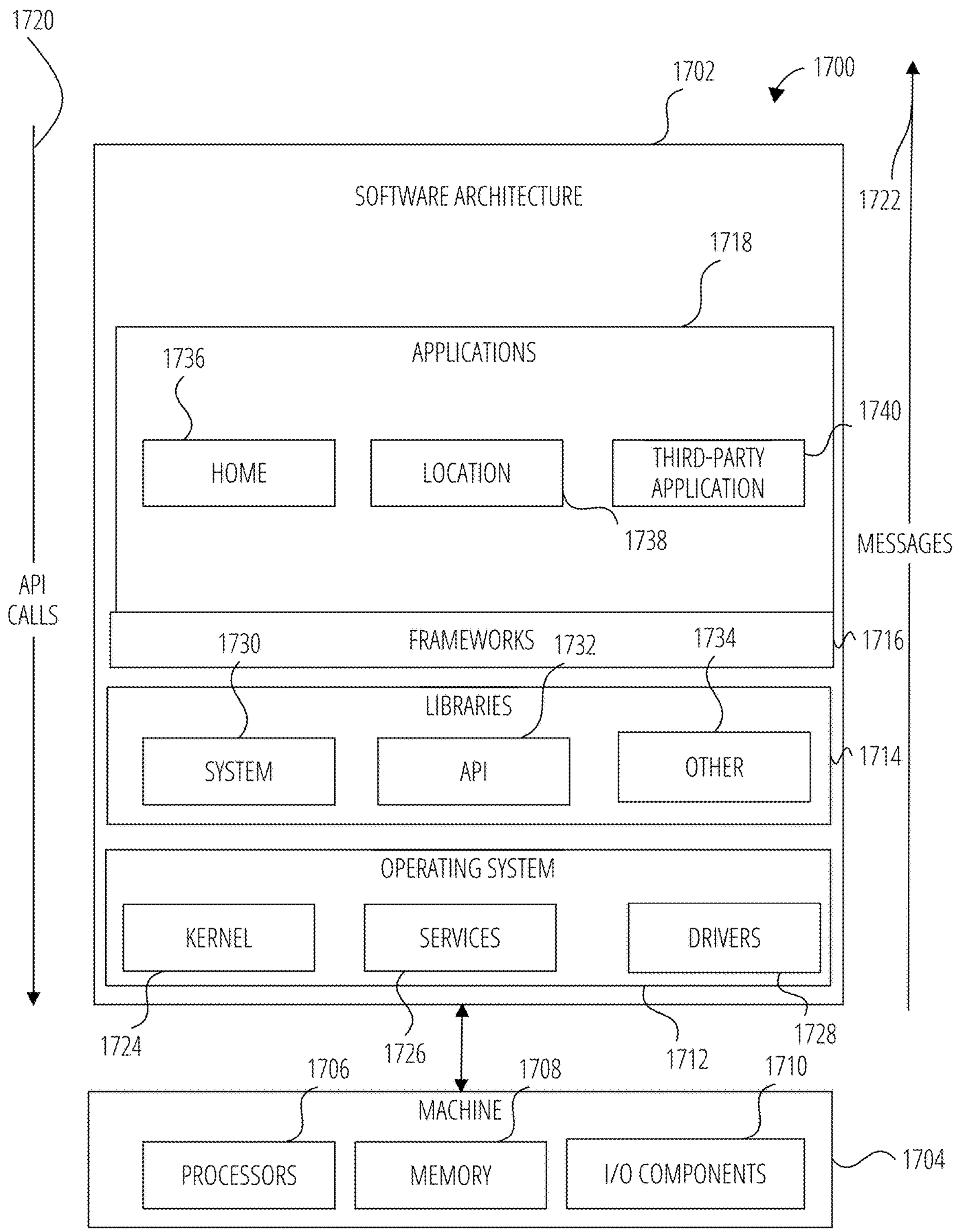
FIG. 17 is a block diagram showing a software architecture within which examples may be implemented, in accordance with some examples.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. The applications 1718 may include the display system 1200 as described herein. Operationally, the applications 1718 invoke API calls 1720 through the software stack and receive messages 1722 in response to the API calls 1720. The described examples and at least some of the functions of the subsystems and controllers thereof, including the display system 1200, may be implemented by components in one or more layers of the software architecture 1702.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1714 can also include a wide variety of other libraries 1734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a location application 1738, and a broad assortment of other applications such as a third-party application 1740. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1720 provided by the operating system 1712 to facilitate functionalities described herein.

Conclusion

Examples described herein may address one or more technical problems associated with color non-uniformity of displays, such as XR displays, as described above. In some examples, the realism and/or accuracy of images presented by a display may be improved. Distraction may be reduced, and presentation of flat colors, skin tones, and/or images of clothing or decorations may be particularly improved. Matching of colors of virtual content with real-world visual content may be improved in XR. Chromatic binocular rivalry may be improved, reducing visual discomfort.

In addition, by providing dynamic color non-uniformity correction based on the brightness and/or magnitude of electrical stimulus of one or more emitters, some examples may provide enhanced display uniformity at lower brightness levels and an extended range of brightness due to the modulation of LED current. Battery life may be extended, and/or heat management simplified, by applying minimal correction at high brightness levels and increasing correction at low brightness levels. Dynamic color non-uniformity correction may thereby allow for the improvement or optimization of the display's performance across various brightness levels, allowing the display system to adapt to different user environments and preferences, and potentially offering an improved visual experience under a broad range of operating conditions. Other technical solutions and features will be appreciated based on the figures, description, and claims herein.

Specific examples are now described.

Example 1 is a display system, comprising: a display comprising an emitter, the emitter being configured to: receive an electrical stimulus having a magnitude; and emit an amount of light that increases with increased magnitude of the electrical stimulus; and a display controller configured to apply an amount of color non-uniformity correction to the display to adjust respective amounts of light of two or more wavelengths emitted by the display, the amount of color non-uniformity correction applied decreasing with increased magnitude of the electrical stimulus.

In Example 2, the subject matter of Example 1 includes, wherein: applying the color non-uniformity correction to the display comprises increasing the magnitude of the electrical stimulus.

In Example 3, the subject matter of Examples 1-2 includes, wherein: the display is a color sequential display; and applying the color non-uniformity correction comprises: scaling relative magnitudes of the electrical stimulus applied during each color sub-frame time period of a plurality of color sub-frame time periods.

In Example 4, the subject matter of Example 3 includes, wherein: applying the color non-uniformity correction further comprises: scaling relative durations of each color sub-frame time period of the plurality of color sub-frame time periods.

In Example 5, the subject matter of Examples 1-4 includes, wherein: applying the color non-uniformity correction comprises: scaling relative magnitudes of the electrical stimulus applied to each pixel of a plurality of pixels of the display.

In Example 6, the subject matter of Examples 1-5 includes, wherein: the display controller determines the magnitude of the electrical stimulus based on: image data received by the display controller; and the amount of color non-uniformity correction.

In Example 7, the subject matter of Example 6 includes, wherein: the display controller further determines the magnitude of the electrical stimulus based on: a brightness configuration setting of the display system.

In Example 8, the subject matter of Example 7 includes, wherein: the brightness configuration setting is determined at least in part based on an ambient light level in an environment of the display.

In Example 9, the subject matter of Examples 1-8 includes, wherein: when the magnitude of the electrical stimulus is a minimum electrical stimulus magnitude, the amount of color non-uniformity correction applied is a maximum amount.

In Example 10, the subject matter of Example 9 includes, wherein: the electrical stimulus is current; the emitter comprises at least one light emitting diode (LED); and the minimum electrical stimulus magnitude is determined based on a minimum current requirement of the at least one LED.

In Example 11, the subject matter of Examples 1-10 includes, wherein: when the magnitude of the electrical stimulus is above a maximum electrical stimulus threshold, the amount of color non-uniformity correction applied is a minimum amount.

In Example 12, the subject matter of Example 11 includes, wherein: the minimum amount is zero.

In Example 13, the subject matter of Examples 1-12 includes, wherein: the electrical stimulus is current.

In Example 14, the subject matter of Examples 1-13 includes, wherein: the amount of color non-uniformity correction applied to the display is based on a calibration process performed during manufacturing of the display.

Example 15 is a method, comprising: determining a magnitude of an electrical stimulus to be applied to an emitter of a display; determining an amount of color non-uniformity correction to apply to the display to adjust respective amounts of light of two or more wavelengths emitted by the display, the amount of color non-uniformity correction decreasing with increased magnitude of the electrical stimulus; applying the amount of color non-uniformity correction to the display; and stimulating the emitter with the electrical stimulus, thereby causing the emitter to emit an amount of light that increases with increased magnitude of the electrical stimulus.

In Example 16, the subject matter of Example 15 includes, wherein: applying the color non-uniformity correction to the display comprises increasing the magnitude of the electrical stimulus.

In Example 17, the subject matter of Examples 15-16 includes, wherein: the display is a color sequential display; and applying the color non-uniformity correction comprises: scaling relative magnitudes of the electrical stimulus applied during each color sub-frame time period of a plurality of color sub-frame time periods.

In Example 18, the subject matter of Example 17 includes, wherein: applying the color non-uniformity correction further comprises: scaling relative durations of each color sub-frame time period of the plurality of color sub-frame time periods.

In Example 19, the subject matter of Examples 15-18 includes, wherein: applying the color non-uniformity correction comprises: scaling relative magnitudes of the electrical stimulus applied to each pixel of a plurality of pixels of the display.

Example 20 is a non-transitory computer-readable storage medium, the computer-readable storage medium including instructions that when executed by at least one processor of a display system, cause the display system to perform operations comprising: determining a magnitude of an electrical stimulus to be applied to an emitter of a display; determining an amount of color non-uniformity correction to apply to the display to adjust respective amounts of light of two or more wavelengths emitted by the display, the amount of color non-uniformity correction decreasing with increased magnitude of the electrical stimulus; applying the amount of color non-uniformity correction to the display; and stimulating the emitter with the electrical stimulus, thereby causing the emitter to emit an amount of light that increases with increased magnitude of the electrical stimulus.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20.

Example 24 is a method to implement of any of Examples 1-20.

Other technical features may be readily apparent to one skilled in the art from the figures, descriptions, and claims herein.

Glossary

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A display system, comprising:

a display comprising an emitter, the emitter being configured to:

receive an electrical stimulus having a magnitude; and emit an amount of light that increases with increased magnitude of the electrical stimulus; and a display controller configured to apply an amount of color non-uniformity correction to the display to adjust respective amounts of light of two or more wavelengths emitted by the display, the amount of color non-uniformity correction applied decreasing with increased magnitude of the electrical stimulus.

2. The display system of claim 1, wherein:

applying the color non-uniformity correction to the display comprises increasing the magnitude of the electrical stimulus.

3. The display system of claim 1, wherein:

the display is a color sequential display; and applying the color non-uniformity correction comprises:

scaling relative magnitudes of the electrical stimulus applied during each color sub-frame time period of a plurality of color sub-frame time periods.

4. The display system of claim 3, wherein:

applying the color non-uniformity correction further comprises:

scaling relative durations of each color sub-frame time period of the plurality of color sub-frame time periods.

5. The display system of claim 1, wherein:

applying the color non-uniformity correction comprises:

scaling relative magnitudes of the electrical stimulus applied to each pixel of a plurality of pixels of the display.

6. The display system of claim 1, wherein:

the display controller determines the magnitude of the electrical stimulus based on:

image data received by the display controller; and the amount of color non-uniformity correction.

7. The display system of claim 6, wherein:

the display controller further determines the magnitude of the electrical stimulus based on:

a brightness configuration setting of the display system.

8. The display system of claim 7, wherein:

the brightness configuration setting is determined at least in part based on an ambient light level in an environment of the display.

9. The display system of claim 1, wherein:

when the magnitude of the electrical stimulus is a minimum electrical stimulus magnitude, the amount of color non-uniformity correction applied is a maximum amount.

10. The display system of claim 9, wherein:

the electrical stimulus is current;

the emitter comprises at least one light emitting diode (LED); and the minimum electrical stimulus magnitude is determined based on a minimum current requirement of the at least one LED.

11. The display system of claim 1, wherein:

when the magnitude of the electrical stimulus is above a maximum electrical stimulus threshold, the amount of color non-uniformity correction applied is a minimum amount.

12. The display system of claim 11, wherein:

the minimum amount is zero.

13. The display system of claim 1, wherein:

the electrical stimulus is current.

14. The display system of claim 1, wherein:

the amount of color non-uniformity correction applied to the display is based on a calibration process performed during manufacturing of the display.

15. A method, comprising:

determining a magnitude of an electrical stimulus to be applied to an emitter of a display;

determining an amount of color non-uniformity correction to apply to the display to adjust respective amounts of light of two or more wavelengths emitted by the display, the amount of color non-uniformity correction decreasing with increased magnitude of the electrical stimulus;

applying the amount of color non-uniformity correction to the display; and stimulating the emitter with the electrical stimulus, thereby causing the emitter to emit an amount of light that increases with increased magnitude of the electrical stimulus.

16. The method of claim 15, wherein:

applying the color non-uniformity correction to the display comprises increasing the magnitude of the electrical stimulus.

17. The method of claim 15, wherein:

the display is a color sequential display; and applying the color non-uniformity correction comprises:

scaling relative magnitudes of the electrical stimulus applied during each color sub-frame time period of a plurality of color sub-frame time periods.

18. The method of claim 17, wherein:

applying the color non-uniformity correction further comprises:

scaling relative durations of each color sub-frame time period of the plurality of color sub-frame time periods.

19. The method of claim 15, wherein:

applying the color non-uniformity correction comprises:

scaling relative magnitudes of the electrical stimulus applied to each pixel of a plurality of pixels of the display.

20. A non-transitory computer-readable storage medium, the computer-readable storage medium including instructions that when executed by at least one processor of a display system, cause the display system to perform operations comprising:

determining a magnitude of an electrical stimulus to be applied to an emitter of a display;

determining an amount of color non-uniformity correction to apply to the display to adjust respective amounts of light of two or more wavelengths emitted by the display, the amount of color non-uniformity correction decreasing with increased magnitude of the electrical stimulus;

applying the amount of color non-uniformity correction to the display; and stimulating the emitter with the electrical stimulus, thereby causing the emitter to emit an amount of light that increases with increased magnitude of the electrical stimulus.

* * * * *